United States Patent
Jenkins et al.

(10) Patent No.: US 9,850,455 B2
(45) Date of Patent: Dec. 26, 2017

(54) CLEANING METHOD

(75) Inventors: Stephen Derek Jenkins, Middlesbrough (GB); Frazer John Kennedy, Sheffield (GB)

(73) Assignee: XEROS LIMITED, Catcliffe, Rotherham, South Yorkshire (GB)

( * ) Notice: Subject to any disclaimer, the term of this patent is extended or adjusted under 35 U.S.C. 154(b) by 1250 days.

(21) Appl. No.: 13/880,386

(22) PCT Filed: Oct. 31, 2011

(86) PCT No.: PCT/GB2011/052117
§ 371 (c)(1),
(2), (4) Date: Jul. 10, 2013

(87) PCT Pub. No.: WO2012/056252
PCT Pub. Date: May 3, 2012

(65) Prior Publication Data
US 2013/0276242 A1    Oct. 24, 2013

(30) Foreign Application Priority Data
Oct. 29, 2010 (GB) .................................. 1018318.4

(51) Int. Cl.
*C11D 17/00* (2006.01)
*C11D 3/37* (2006.01)
(Continued)

(52) U.S. Cl.
CPC ............ *C11D 17/0013* (2013.01); *C11D 3/37* (2013.01); *C11D 3/3715* (2013.01);
(Continued)

(58) Field of Classification Search
None
See application file for complete search history.

(56) References Cited

U.S. PATENT DOCUMENTS 4,575,887 A * 3/1986 Viramontes ........ D06B 11/0096
210/767
4,750,227 A  6/1988 Hopkins et al.
(Continued)

FOREIGN PATENT DOCUMENTS

CN    1723008 A    1/2006
CN  101885605      11/2010
(Continued)

OTHER PUBLICATIONS

International Preliminary Report on Patentability and Written Opinion of the International Searching Authority; PCT/GB2011/052117; International Filing Date Oct. 31, 2011; Xeros Limited et al.; dated May 10, 2013; 15 pages.

*Primary Examiner* — Jason Ko
*Assistant Examiner* — Spencer Bell
(74) *Attorney, Agent, or Firm* — Nexsen Pruet, PLLC; E. Eric Mills

(57) ABSTRACT

The invention provides a method for the cleaning of a soiled substrate, the method comprising treating the substrate with a solid particulate cleaning material and wash water, the treatment being carried out in an apparatus comprising a drum comprising perforated side walls and having a capacity of between 5 and 50 liters for each kg of fabric in the washload, wherein said solid particulate cleaning material comprises a multiplicity of polymeric particles at a particle to fabric addition level of 0.1:1-10:1 by mass, each particle being substantially cylindrical or spherical in shape and having an average density in the range of 0.5-2.5 g/cm$^3$ and an average volume in the range of 5-275 mm$^3$, and wherein said drum comprising perforated side walls is rotated at a speed which generates G forces in the range of from 0.05 to 900 G. The polymeric particles may comprise foamed or unfoamed polymeric materials which may comprise either linear or crosslinked polymers. Preferably, at least one (Continued)

Cylindrical, Spherical and Perfect Sphere Size Parameters detergent is employed in the cleaning process. The invention provides optimum cleaning performance as a result of improved mechanical interaction between substrate and cleaning media and is preferably used for the cleaning of textile fabrics. The method allows for significant reductions in the consumption of detergents, water and energy when compared with the conventional wet cleaning of textile fabrics, and also facilitates reduced washing-related textile fabric damage. The invention also envisages a cleaning composition comprising a solid particulate cleaning composition and at least one additional cleaning agent. In particular embodiments of the invention, the solid particulate cleaning material is separated and recovered and then re-used in subsequent cleaning processes. Typically, the solid particulate cleaning material is itself cleaned intermittently in order to maintain its efficacy.

16 Claims, 17 Drawing Sheets

(51) Int. Cl.
  *C11D 11/00*     (2006.01)
  *D06F 35/00*     (2006.01)
  *A47L 15/00*     (2006.01)

(52) U.S. Cl.
  CPC .......... *C11D 3/3719* (2013.01); *C11D 3/3726* (2013.01); *C11D 3/3749* (2013.01); *C11D 11/0017* (2013.01); *C11D 11/0023* (2013.01); *D06F 35/006* (2013.01); *A47L 15/0007* (2013.01); *A47L 2601/18* (2013.01); *Y02B 40/56* (2013.01)

(56) References Cited

U.S. PATENT DOCUMENTS

| | | |
|---|---|---|
| 5,245,722 A | 9/1993 | Dameron |
| 5,367,734 A | 11/1994 | Terry |
| 5,475,992 A | 12/1995 | Wiegert |
| 5,978,994 A | 11/1999 | Anderson |
| 2002/0133886 A1* | 9/2002 | Severns ............ B01J 20/28033 8/142 |
| 2004/0025262 A1 | 2/2004 | Hamers et al. |
| 2009/0217461 A1* | 9/2009 | Burkinshaw ......... C11D 3/3719 8/137 |
| 2010/0281928 A1 | 11/2010 | Martin |

FOREIGN PATENT DOCUMENTS

| | | |
|---|---|---|
| CN | 101886321 A1 | 11/2010 |
| DE | 2819233 A1 | 5/1978 |
| DE | 19505921 A1 | 8/1996 |
| DE | 102007029485 A1 | 1/2009 |
| EP | 2103677 A1 | 9/2009 |
| JP | 2004238602 A | 8/2004 |
| JP | 03146094 A | 9/2004 |
| WO | 2007128962 A1 | 11/2007 |
| WO | 2009112296 A1 | 9/2009 |
| WO | 2010094959 A1 | 8/2010 |
| WO | 2010128337 A2 | 11/2010 |
| WO | 2011064581 A1 | 6/2011 |
| WO | 2011098815 A1 | 8/2011 |

\* cited by examiner

Uncleaned Xeros Stain Set and Sebum Sheet

XP6 – Hotpoint Conventional 15°C - Persil Small & Mighty
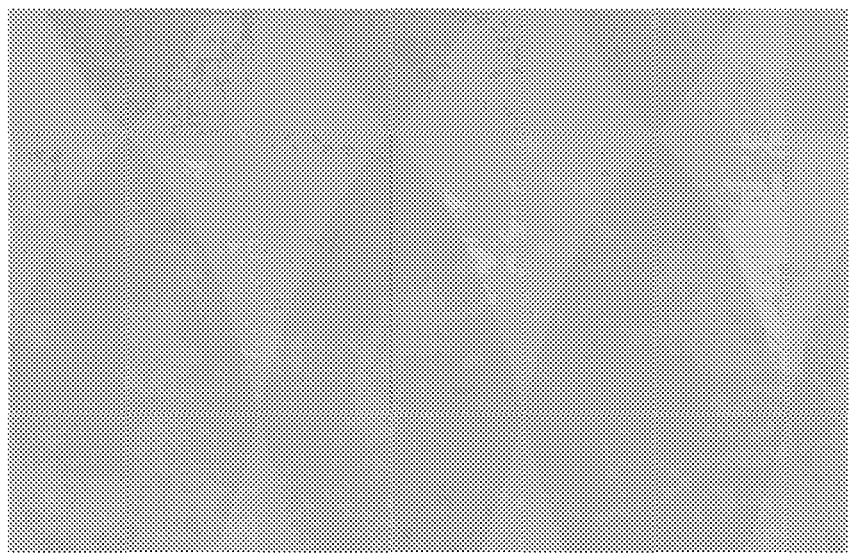
XP6 – Domestic, 15°C, Persil Small & Mighty
FIG. 3

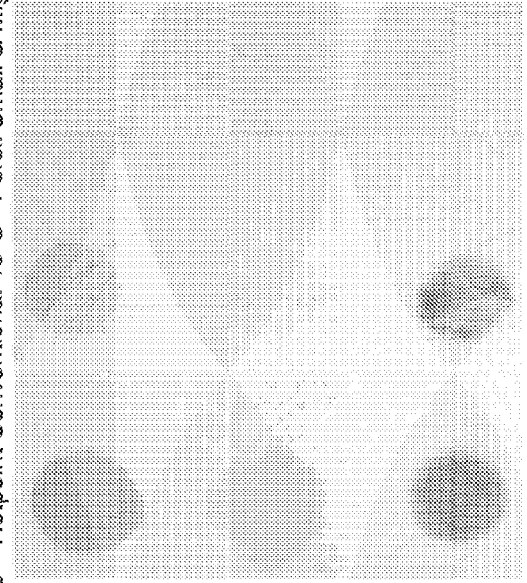
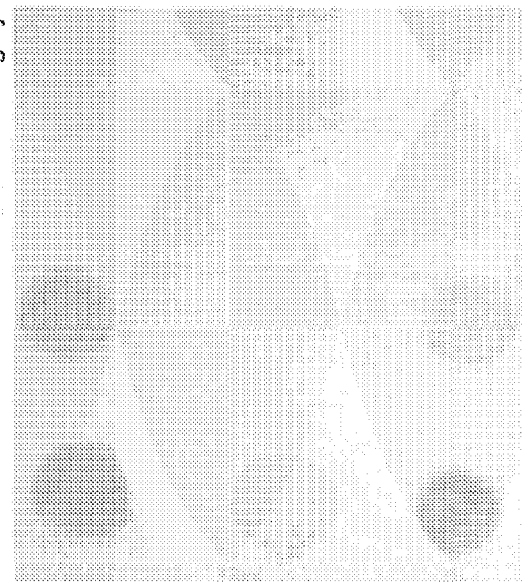
FIG. 6

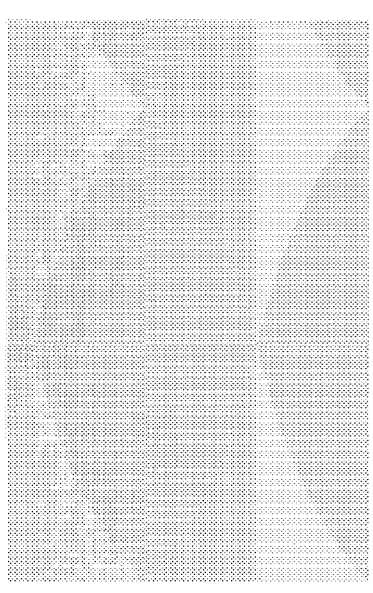
FIG. 7

FIG. 8 EMPA 306 Test Cloth Washed According to the Invention

EMPA 306 Test Cloth Washed by Conventional Process in BEKO WM5120W

Unwashed EMPA 306 Test Cloth

FIG. 11(a) Unwashed PCMS-55_05-05x05 Stain Monitor from WFK

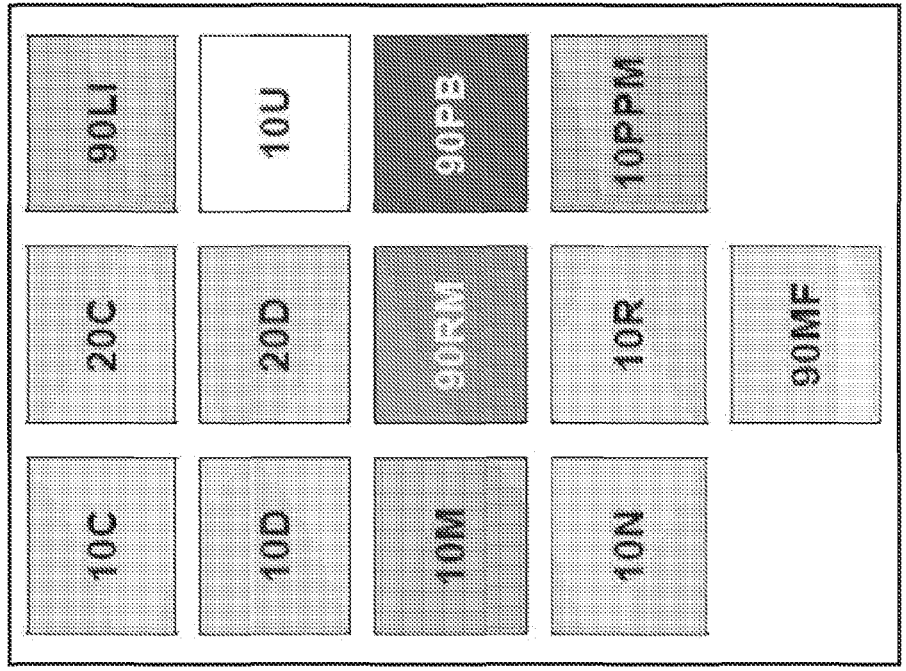

| Stain Type | Code |
|---|---|
| Pigment/Lanolin on cotton | 10C |
| Pigment/Lanolin on polyester-cotton | 20C |
| Red wine, aged (IEC456) on cotton | 90LJ |
| Pigment/Sebum on cotton | 10D |
| Pigment/Sebum on polyester -cotton | 20D |
| Curry on cotton | 10U |
| Motor oil/Pigment on cotton | 10M |
| Soot/Mineral oil (IEC456) on cotton | 90RM |
| Blood, aged (IEC456) on cotton | 90PB |
| Egg/Pigment on cotton | 10N |
| Starch/Pigment on cotton | 10R |
| Pigment/Vegetable fat/Milk on cotton | 10PPM |
| Cocoa, aged (IEC456) on cotton | 90MF |

Stain Key for PCMS-55_05-05x05 Stain Monitor from WFK

FIG. 11(b)

Xeros Ambient Wash Temperature 15°C

Miele ML1 Control Wash Temperature 40°C

Xeros Standard Wash Temperature 40°C

Miele ML2 Control Wash Temperature 60°C

Cylindrical, Spherical and Perfect Sphere Size Parameters

CLEANING METHOD

FIELD OF THE INVENTION

The present invention relates to the aqueous cleaning of soiled substrates, specifically textile fibres and fabrics, using a cleaning system comprising polymeric particles. More specifically, the invention is concerned with the use of polymeric particles in a system designed to improve mechanical interaction between said particles and the fabrics, and allow the easy removal of said particles from the fabrics after the cleaning process is complete, thereby facilitating their re-use in subsequent cleaning processes.

BACKGROUND TO THE INVENTION

Aqueous cleaning processes are a mainstay of both domestic and industrial textile fabric washing. On the assumption that the desired level of cleaning is achieved, the efficacy of such processes is usually characterised by their levels of consumption of energy, water and detergent. In general, the lower the requirements with regard to these three components, the more efficient the washing process is deemed. The downstream effect of reduced water and detergent consumption is also significant, as this minimises the need for disposal of aqueous effluent, which is both extremely costly and detrimental to the environment.

Such washing processes, whether involving domestic washing machines or their industrial equivalents (usually referred to as washer extractors) involve aqueous submersion of fabrics followed by soil removal, aqueous soil suspension, and water rinsing. In general, the higher the level of energy (or temperature), water and detergent which is used, the better the cleaning. The key issue, however, concerns water consumption, as this sets the energy requirements (in order to heat the wash water), and the detergent dosage (to achieve the desired detergent concentration). In addition, the water usage level defines the mechanical action of the process on the fabric, which is another important performance parameter; this is the agitation of the cloth surface during washing, which plays a key role in releasing embedded soil. In aqueous processes, such mechanical action is provided by the water usage level, in combination with the drum design for any particular washing machine. In general terms, it is found that the higher the water level in the drum, the better the mechanical action. Hence, there is a dichotomy created by the desire to improve overall process efficiency (i.e. the reduction of energy, water and detergent consumption), and the need for efficient mechanical action in the wash. For domestic washing in particular there are defined wash performance standards specifically designed to discourage the use of such higher levels in practice, in addition to the obvious cost penalties which are associated with such usage.

Current efficient domestic washing machines have made significant strides towards minimising their consumptions of energy, water and detergent. EU Directive 92/75/CEE sets a standard which defines washing machine energy consumption in kWh/cycle (cotton setting at 60° C.), such that an efficient domestic washing machine will typically consume <0.19 kWh/kg of washload in order to obtain an 'A' rating. If water consumption is also considered, then 'A' rated machines use <9.7 liters/kg of washload.

Detergent dosage is then driven by manufacturer recommendations but, again, in the domestic market, for a concentrated liquid formulation, a quantity of 35 ml (or 37 g) for a 4-6 kg washload in soft and medium hardness water, increasing to 52 ml (or 55 g) for a 6-8 kg washload (or in hard water or for very dirty items) is typical (see, for example, Unilever pack dosage instructions for Persil® Small & Mighty). Hence, for a 4-6 kg washload in soft/medium water hardness, this equates to a detergent dosage of 7.4-9.2 g/kg whilst, for a 6-8 kg washload (or in hard water or for very dirty items), the range is 6.9-9.2 g/kg.

Energy, water and detergent consumptions in the industrial washing process (washer extractors) are considerably different, however, and usages of all three resources are less constrained, since these are principal factors in reducing cycle time—which is, of course, more of a consideration than in the case of domestic processes. For a typical industrial washer extractor (25 kg washload rated and above), energy consumption is >0.30 kWh/kg, water is at ~20 liters/kg, and detergent is much more heavily dosed than for domestic washing. The exact level of detergent used will depend on the amount of soiling, but a range of 18-70 g/kg is representative.

Thus, it can be taken from the above discussion that it is the performance levels in the domestic sector which set the highest standard for an efficient fabric washing process, and that these are: an energy consumption of <0.19 kWh/kg, a water usage of <9.7 liters/kg, and a detergent dosage of approximately 8.0 g/kg (8.5 ml/kg). However, as previously observed, it is becoming increasingly difficult to reduce the water (and, hence, energy and detergent) levels in a purely aqueous process, due to the minimum requirement to wet the fabric thoroughly, the need to provide sufficient excess water to suspend the soil removed in an aqueous liquor and, finally, the necessity to rinse the fabric.

Heating of the wash water is then the principal use of energy, and a minimum level of detergent becomes necessary in order for an effective concentration to be reached at the operating wash temperature. Means to improve mechanical action without increasing the water level used would, therefore, make any aqueous wash process significantly more efficient (i.e. yield further reductions in energy, water and detergent consumption). It should be noted that mechanical action itself has a direct effect on the detergent level, since the greater the level of soil removal which is achieved through physical force, the less that is required of the detergent chemistry. However, increasing the mechanical action in a purely aqueous washing process has certain associated drawbacks. Fabric creasing readily occurs in such processes, and this acts to concentrate the stresses from mechanical action at each crease, resulting in localised fabric damage. Prevention of such fabric damage (i.e. fabric care) is of primary concern to the domestic consumer and the industrial user.

In the light of these challenges which are associated with aqueous washing processes, the present inventors have previously devised a new approach to the problem, which allows the deficiencies demonstrated by the methods of the prior art to be overcome. The method which is provided eliminates the requirement for the use of large volumes of water, but is still capable of providing an efficient means of cleaning and stain removal, whilst also yielding economic and environmental benefits.

Thus, in WO-A-2007/128962 there is disclosed a method and formulation for cleaning a soiled substrate, the method comprising the treatment of the moistened substrate with a formulation comprising a multiplicity of polymeric particles, wherein the formulation is free of organic solvents. Preferably, the substrate is wetted so as to achieve a substrate to water ratio of between 1:0.1 to 1:5 w/w, and optionally, the formulation additionally comprises at least one cleaning material, which typically comprises a surfactant, which most preferably has detergent properties. In preferred embodiments, the substrate comprises a textile fibre and the polymeric particles may, for example, comprise particles of polyamides, polyesters, polyalkenes, polyurethanes or their copolymers, but are most preferably in the form of nylon beads.

The use of this polymeric particle-based cleaning method, however, presents a requirement for the cleaning particles to be efficiently separated from the cleaned substrate at the conclusion of the cleaning operation, and this issue is addressed in WO-A-2010/094959, which provides a novel design of cleaning apparatus requiring the use of two internal drums capable of independent rotation, and which finds application in both industrial and domestic cleaning processes.

In co-pending WO-A-2011/064581, there is provided a further apparatus which facilitates efficient separation of cleaning particles from the cleaned substrate at the conclusion of the cleaning operation, and which comprises a perforated drum and a removable outer drum skin which is adapted to prevent the ingress or egress of fluids and solid particulate matter from the interior of the drum, the cleaning method requiring attachment of the outer skin to the drum during a wash cycle, after which the skin is removed prior to operating a separation cycle to remove the cleaning particles, following which the cleaned substrate is removed from the drum.

In a further development of the apparatus of WO-A-2011/064581, there is disclosed in co-pending WO-A-2011/098815 a process and apparatus which provides for continuous circulation of the polymeric cleaning particles during the cleaning process, and thereby dispenses with the requirement for the provision of an outer skin.

The apparatus and methods disclosed in the foregoing prior art documents have been highly successful in providing an efficient means of cleaning and stain removal which also yields significant economic and environmental benefits. In seeking to further develop the method and apparatus of the cleaning process, the present inventors have now sought to provide a process which offers still further benefits in terms of reduced power and consumable requirements, and have succeeded in refining the technology such that it is possible to achieve at least equivalent cleaning performance whilst employing significantly reduced levels of detergents and, surprisingly, at much lower process temperatures. In addition they have increased the level of removal of the polymeric particles from the fabric washload at the end of the cleaning process in the washing apparatus used. It is of course a pre-requisite for such polymeric cleaning processes that particle removal is maximised, both for user convenience and to enable particle re-use in subsequent cleaning processes.

Therefore, in the presently claimed invention, the inventors have sought, by careful control of polymeric particle size, shape and density, and also process parameters, to provide a process in which the cleaning effect achieved as a consequence of mechanical interaction of a soiled substrate with the cleaning media is optimised. The inventors have succeeded in achieving a cleaning process which facilitates excellent cleaning performance at surprisingly low cleaning temperatures (i.e. low energy) and with reduced levels of added detergents, whilst also maintaining the original low water consumption. As previously discussed, effective targets for these savings would be significant reductions below an energy consumption of 0.19 kWh/kg, a water usage of 9.7 liters/kg, and a detergent dosage of 8.0 g/kg (8.5 ml/kg), whilst delivering parity cleaning performance. The current invention allows a new washing process capable of exceeding these targets, whilst also facilitating reduced localised fabric damage in the washed substrate by virtue of the increased uniformity of the mechanical action of the particles with the fabric surface.

In addition, removal levels of polymeric particles from the fabric washload at the end of the cleaning process have been increased to >99.9%, this parameter being defined as:

$$\text{Bead Removal Level}=100-((B_{Ret}/B_{Tot})\times100)$$

expressed as a percentage, where $B_{Ret}$ is the number of beads retained by the washload, and $B_{Tot}$ is the total number of beads used in the cleaning process. Once removed the particles are then re-used in subsequent cleaning processes.

SUMMARY OF THE INVENTION

The present invention derives from an appreciation on the part of the inventors that optimum cleaning performance can be achieved as a result of improved mechanical interaction between substrate and cleaning media, as well as controlled soil adsorption and absorption onto the surface of the media. This can be effected as a function of the chemical composition, number, size, shape and density of the particles of cleaning media and the free volume within the vessel in which the cleaning operation takes place, in addition to the G force dictated by its speed of rotation. Free volume in this context refers to the space inside the vessel which remains unoccupied by washload or particulate cleaning media, and G force is defined on the basis of the centripetal forces which are acting.

Thus, according to a first aspect of the present invention, there is provided a method for the cleaning of a soiled substrate, said method comprising treating the substrate with a solid particulate cleaning material and wash water, said treatment being carried out in an apparatus comprising a drum comprising perforated side walls and having a capacity of between 5 and 50 liters for each kg of fabric in the washload, wherein said solid particulate cleaning material comprises a multiplicity of polymeric particles at a particle to fabric addition level of 0.1:1-10:1 by mass, each particle being substantially cylindrical or spherical in shape and having an average density in the range of 0.5-2.5 g/cm$^3$ and an average volume in the range of 5-275 mm$^3$, and wherein said drum comprising perforated side walls is rotated at a speed which generates G forces in the range of from 0.05 to 900 G.

In the context of the presently claimed invention, it will be appreciated that the shape descriptors for the polymeric particles are idealised and that, in practice, polymeric particles cut from a molten polymer lace, either in air or in another fluid, will be less than perfectly cylindrical or spherical. Thus, "cylindrical" in this context means a particle which has either a circular or oval cross section, and an aspect ratio of length divided by width (shortest axis in the case of oval cross sections) typically in the region of from 0.5-10. Such particles are also characterised by the surfaces forming their cross section being flatter than the surface forming their circumference.

"Spherical" in this context means a particle which does not have a cross section with flat surfaces, and an aspect ratio of length divided by width of ~1. Perfect spheres may also optionally be used as polymeric particles, although these are generally more expensive as their manufacture involves either an injection or compression moulding step.

In one embodiment, cylindrical particles of oval cross section have a major cross section axis length (denoted a) of 2.0-6.0 mm, a minor cross section axis length (denoted b) of 1.3-5.0 mm (a>b), and a length (denoted h) of 1.5-6.0 mm (h/b is typically in the range of 0.5-10). In an alternative embodiment, if the cylindrical particle cross section is circular, then the diameter of the particle (denoted $d_c$) is 1.3-6.0 mm, and its length (denoted $h_c$) is 1.5-6.0 mm ($h_c/d_c$ is typically in the range of 0.5-10).

In a further embodiment, spherical particles have a diameter (denoted $d_s$) of 2.0-8.0 mm. In the event that perfect spheres are used, then the diameter (denoted $d_{ps}$) is again typically from 2.0-8.0 mm.

In typical embodiments of the invention, the claimed method additionally provides for separation and recovery of the polymeric particles, which are then re-used in subsequent cleaning processes.

The polymeric particles may comprise either foamed or unfoamed polymeric materials. Furthermore, the polymeric particles may comprise polymers which are either linear or crosslinked.

In certain embodiments of the invention, the drum comprising perforated side walls comprises a rotatably mounted cylindrical cage.

The volume of wash water added to the system provides a wash water to fabric ratio which is typically between 5.0:1 and 0.1:1 w/w, and the overall volumes of water which are employed (including rinse water) are significantly lower than in conventional washing processes.

In typical embodiments of the invention, the formulation additionally comprises at least one additional cleaning agent, which optionally comprises at least one detergent composition.

The generation of suitable G forces, in combination with the action of the solid particulate cleaning material, is a key factor in achieving an appropriate level of mechanical interaction of the particles with the soiled substrate. G is a function of the drum size and the speed of rotation of the drum and, specifically, is the ratio of the centripetal force generated at the inner surface of the cage to the static weight of the washload. Thus, for a cage of inner radius r (m), rotating at R (rpm), with a washload of mass M (kg), and an instantaneous tangential velocity of the cage v (m/s), and taking g as the acceleration due to gravity at 9.81 m/s$^2$:

Centripetal force=$Mv^2/r$

Washload static weight=$Mg$ $v = 2\pi R/60$

Hence, $G = 4\pi^2 r^2 R^2 / 3600 rg = 4\pi^2 r R^2 / 3600 g = 1.118 \times 10^{-3} rR^2$ When, as is usually the case, r is expressed in centimeters, rather than meters, then:

$G = 1.118 \times 10^{-5} rR^2$

Hence, for a drum of radius 48 cm rotating at 800 rpm, G=350.6.

In an embodiment of the invention, a cylindrical drum having a diameter of 98 cm is rotated at a speed of 30-800 rpm in order to generate G forces of 0.49-350.6 at different stages during the cleaning process. In examples of alternative embodiments of the invention, a 48 cm diameter drum rotating at 1600 rpm can generate 688 G, whilst a 60 cm diameter drum at the same speed of rotation generates 860 G.

In certain embodiments of the invention, said polymeric particles comprise polyalkenes such as polyethylene and polypropylene, polyamides, polyesters or polyurethanes, which may be foamed or unfoamed. Furthermore, said polymers may be linear or crosslinked. Typically, however, said polymeric particles comprise polyamide or polyester particles, most particularly particles of nylon, polyethylene terephthalate or polybutylene terephthalate, frequently in the form of beads. Said polyamides and polyesters are found to be particularly effective for aqueous stain/soil removal, whilst polyalkenes are especially useful for the removal of oil-based stains.

Optionally, copolymers of the above polymeric materials may be employed for the purposes of the invention. Specifically, the properties of the polymeric materials may be tailored to specific requirements by the inclusion of monomeric units which confer particular properties on the copolymer. Thus, the copolymers may be adapted to attract particular staining materials by comprising monomers which, inter alia, are ionically charged, or include polar moieties or unsaturated organic groups.

The polymeric particles are of such a shape and size as to allow for good flowability and intimate contact with the soiled substrate, which typically comprises a textile fabric. In the context of the present invention, therefore, said particles comprise cylindrical or spherical beads. It is found that the combination of particle size, shape and density is such that the mechanical interaction of the particle with the fabric is optimised, it being sufficiently vigorous to provide effective cleaning but, at the same time, uniform and gentle enough to reduce fabric damage when compared with conventional aqueous processes. It is, in particular, the uniformity of the mechanical action generated by the chosen particles across the entire fabric surface that is the key factor in this regard. The particle parameters are also controlled so as to allow for easy separation of the particles from the fabric washload at the end of the wash process. Thus, particle size and shape may be controlled in order to minimise entanglement with the fabric, and the combination of suitable particle density with low G (<1) and high free volume in the washing machine tumbling process together promote particle removal under gravity through the perforations in the drum sidewall.

The particles may have smooth or irregular surface structures and can be of solid or hollow construction. Particles have an average density in the range of 0.5-2.5 g/cm$^3$, preferably from 0.55-2.0 g/cm$^3$, more preferably from 0.6-1.9 g/cm$^3$. The average volume of the particles is in the range of 5-275 mm$^3$, preferably from 8-140 mm$^3$, more preferably from 10-120 mm$^3$.

In the case of cylindrical beads of oval cross section, the major cross section axis length, a, is typically in the range of from 2.0-6.0 mm, more typically from 2.2-5.0 mm, most typically from 2.4-4.5 mm, and the minor cross section axis length, b, is typically in the range of from 1.3-5.0 mm, more typically from 1.5-4.0 mm, and most typically from 1.7-3.5 mm (a>b). The length of such beads, h, is typically from 1.5-6.0 mm, more typically from 1.7-5.0 mm, and most typically from 2.0-4.5 mm (h/b typically in the range of 0.5-10).

For cylindrical beads of circular cross section, the typical cross section diameter, $d_c$, is in the range of from 1.3-6.0 mm, more typically from 1.5-5.0 mm, and most typically from 1.7-4.5 mm. The typical length, $h_c$, of such beads is again from 1.5-6.0 mm, more typically from 1.7-5.0 mm, and most typically from 2.0-4.5 mm ($h_c/d_c$ typically in the range of 0.5-10).

In the case of spherical beads, the diameter, $d_s$, is typically in the range of from 2.0-8.0 mm, more typically from 2.2-5.5 mm, and most typically from 2.4-5.0 mm.

In embodiments wherein the beads comprise perfect spheres, the diameter, $d_{ps}$, is typically in the range of from 2.0-8.0 mm, more typically from 3.0-7.0 mm, and most typically from 4.0-6.5 mm.

Said rotatably mounted cylindrical cage is comprised in any suitable cleaning apparatus comprising a housing and access means, allowing access to the interior of said cylindrical cage, suitable examples of which are disclosed in WO-A-2010/094959, WO-A-2011/064581 and WO-A-2011/098815.

Optionally, said rotatably mounted cylindrical cage may be concentrically located within a rotatably mounted cylindrical drum having a greater diameter than said cage, wherein said cage and said drum are concentrically located within a stationary cylindrical drum having a greater diameter than said rotatably mounted drum, and wherein said rotatably mounted cylindrical cage and said rotatably mounted cylindrical drum are adapted to rotate independently.

More preferably, however, said rotatably mounted cylindrical cage is mounted in a first chamber within said housing means, which also comprises a second chamber located adjacent said cylindrical cage. Said apparatus typically also comprises at least one recirculation means and a multiplicity of delivery means.

In certain embodiments of the invention, said apparatus additionally comprises sealing means, removably attached to the outer surface of the cylindrical side walls of said rotatably mounted cylindrical cage, and adapted to prevent the ingress or egress of fluids and solid particulate matter from the interior of said cage.

In alternative embodiments of the invention, said apparatus additionally comprises pumping means, and up to 60% of the surface area of the perforated side walls of said rotatably mounted cylindrical cage comprises perforations, and said perforations comprise holes having a diameter of no greater than 25.0 mm.

As a consequence of employing the cleaning method of the present invention, excellent cleaning performance may be achieved whilst using reduced levels of detergents and surprisingly low cleaning temperatures (i.e. lower energy consumption), whilst also maintaining low water consumption levels. Thus, cleaning operations according to the invention, whilst possible at temperatures of up to 95° C., are typically carried out at temperatures not exceeding 75° C., and optimum performance is generally achieved at 5-40° C. As an approximate guide, it is found that if a conventional aqueous cleaning process requires a wash temperature of T° C., then the process according to the present invention will provide superior cleaning at temperatures in the range of T-10° C. to T-25° C. Removal of the beads from the fabric washload at the end of the cleaning process is expedited on the basis of the specific size, shape and density of the beads used, and also by control of process parameters, in order to enable bead re-use in subsequent cleaning processes.

Thus, the present inventors have provided a process for the cleaning of soiled substrates which provides improved cleaning performance, reduced damage to the substrate being cleaned, and significantly reduced consumption of energy, detergent and water. These improvements result from improved mechanical interaction between the cleaning material and the substrate, which result from the careful selection of both apparatus parameters and the physical properties of the solid particulate cleaning material as herein defined. Furthermore, by virtue of this selection of parameters and properties, the process allows for the efficient collection of the solid particulate cleaning material after completion of the process such that it may be re-used in subsequent cleaning procedures.

A further aspect of the invention envisages a cleaning composition as hereinbefore defined comprising a solid particulate cleaning composition and at least one additional cleaning agent. Typically, said at least one additional cleaning agent comprises at least one detergent composition.

BRIEF DESCRIPTION OF THE DRAWINGS

Embodiments of the invention are further described hereinafter with reference to the accompanying drawings, in which:

FIG. 3 shows the results of a wash test using a standard domestic washing machine performed at 15° C. and the detergent Persil® Small & Mighty;

FIG. 6 shows the results of a wash test using an apparatus and process of the invention compared to a standard domestic washing machine;

FIG. 7 shows more results of a wash test using an apparatus and process of the invention compared to a standard domestic washing machine;

DETAILED DESCRIPTION OF THE INVENTION

Figure 1:
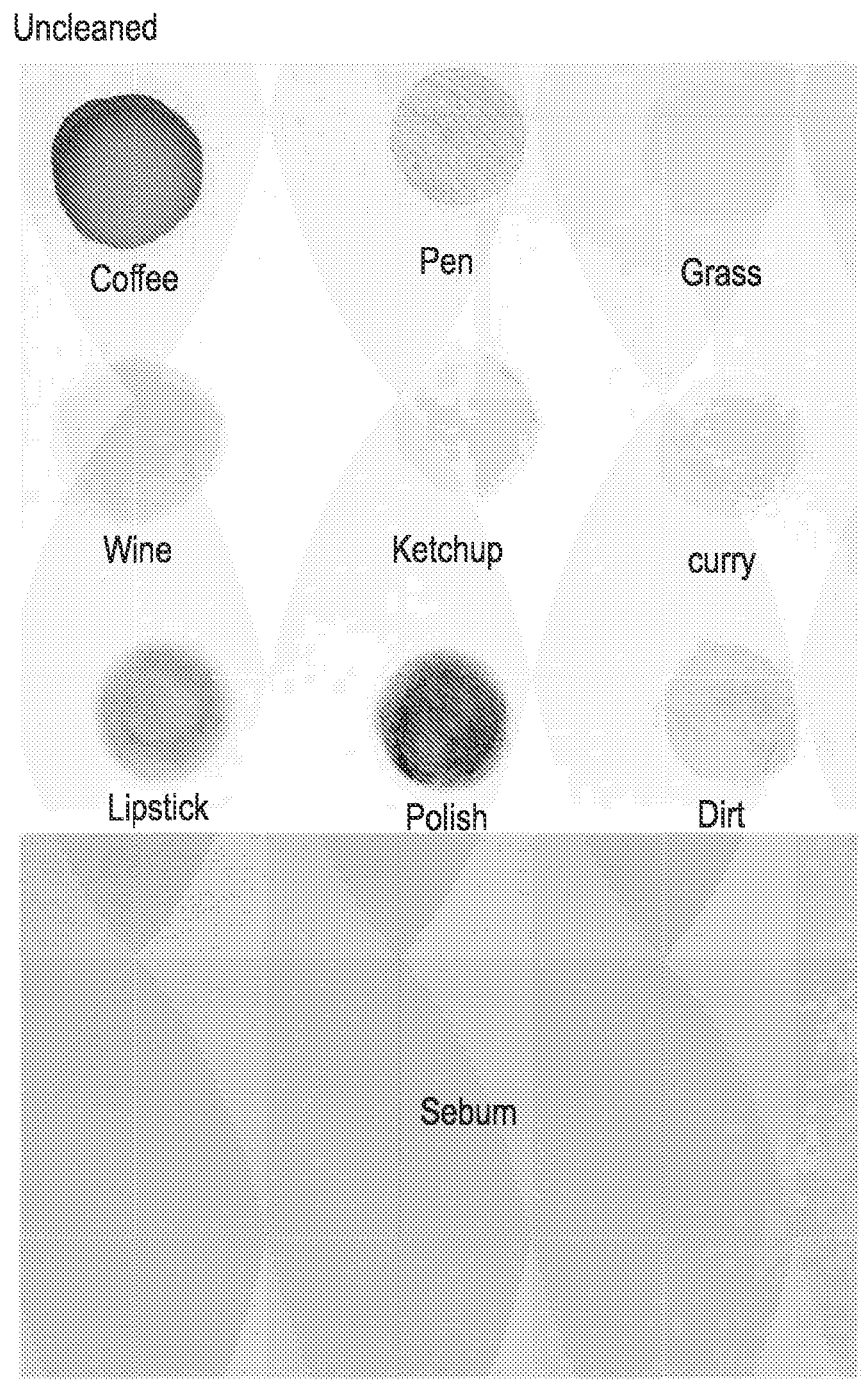
FIG. 1 shows an uncleaned stain set and sebum sheet.

In apparatus employed in the method of the invention, the access means typically comprises a hinged door mounted in the housing, which may be opened to allow access to the inside of the cylindrical cage, and which may be closed in order to provide a substantially sealed system. Preferably, the door includes a window.

Said rotatably mounted cylindrical cage may be mounted vertically within said housing means but, most preferably, is mounted horizontally within said housing means. Consequently, in preferred embodiments of the invention, said access means is located in the front of the apparatus, providing a front-loading facility. When the rotatably mounted cylindrical cage is vertically mounted within the housing means, the access means is located in the top of the apparatus, providing a top-loading facility.

Rotation of said rotatably mounted cylindrical cage is effected by use of drive means, which typically comprises electrical drive means, in the form of an electric motor. Operation of said drive means is effected by control means which may be programmed by an operative.

The method according to the invention typically comprises performing, in sequence, the steps of:
(a) washing;
(b) first extraction of excess water;
(c) first separation of polymeric particles;
(d) rinsing;
(e) second extraction of excess water;
(f) optionally repeating steps (d) and (e) at least once; and
(g) second separation of polymeric particles.

Said first separation of polymeric particles (beads) typically removes >50% of the particles, whilst the second separation of polymeric particles ensures removal of >99.9% of these particles. Optionally, the first separation of polymeric particles can be extended to provide removal of >99.9% of particles, but it is more efficient to take advantage of steps (d) and (e), as these also inherently remove some particles, before moving to step (g) for final separation. This is particularly true if steps (d) and (e) are repeated.

Preferably, steps (d) and (e) are repeated several times, typically at least 2-3 times, but possibly up to 10 times.

Said rotatably mounted cylindrical cage more preferably has a volume of between 5 and 50 liters for each kg of fabric in the washload. Preferred rates of rotation of said rotatably mounted cylindrical cage are sufficient to give G forces of between 0.05 and 900 G. Typically the washing process is carried out at between 0.05 and 0.95 G, and the rinsing water is added under similar conditions, before extraction of the excess water at higher G force, typically 5.5 to 350 G. Final separation of the beads from the fabric is then carried out again at 0.05 to 0.95 G. After separation, the beads are recovered for use in subsequent cleaning processes.

Thus, for a 98 cm diameter cage, the speeds of rotation are advantageously in the range of 10-800 rpm. Typically the washing process is carried out between 10 and 42 rpm and the rinsing water is added under similar conditions, before extraction of the excess water takes place at 100-800 rpm. Final separation of the beads from the fabric is then carried out at 10-42 rpm, and the separated beads are recovered for use in subsequent cleaning processes.

According to the method of the invention, said apparatus operates in conjunction with soiled substrates and cleaning media comprising a solid particulate material, which is most preferably in the form of a multiplicity of polymeric particles. These polymeric particles are required to be efficiently circulated to promote optimum cleaning performance and the apparatus, therefore, preferably includes circulation means. Thus, the inner surface of the cylindrical side walls of said rotatably mounted cylindrical cage preferably comprises a multiplicity of spaced apart elongated protrusions affixed essentially perpendicularly to said inner surface. Preferably, said protrusions additionally comprise air amplifiers which are typically driven pneumatically and are adapted so as to promote circulation of a current of air within said cage. Typically said apparatus comprises from 3 to 10, most preferably 4, of said protrusions, which are commonly referred to as lifters.

In operation, agitation is provided by rotation of said rotatably mounted cylindrical cage. However, in preferred embodiments of the invention, there is also provided additional agitating means, in order to facilitate the efficient removal of residual solid particulate material at the conclusion of the cleaning operation. Preferably, said agitating means comprises an air jet.

Said housing means is connected to standard plumbing features, thereby preferably providing at least one recirculation means, in addition to a multiplicity of delivery means, by virtue of which at least water and, optionally, cleaning agents such as surfactants, enzymes and bleaches may be introduced into the apparatus. Said apparatus may additionally comprise means for circulating air within said housing means, and for adjusting the temperature and humidity therein. Said means may typically include, for example, a recirculating fan, an air heater, a water atomiser and/or a steam generator. Additionally, sensing means may also be provided for determining the temperature and humidity levels within the apparatus, and for communicating this information to the control means.

According to certain embodiments of the invention, the at least one recirculation means facilitates recirculation of said solid particulate material from a second chamber to said rotatably mounted cylindrical cage, for re-use in subsequent cleaning processes. Preferably, first recirculation means comprises ducting connecting said chamber and said rotatably mounted cylindrical cage. More preferably, said ducting comprises separating means for separating said solid particulate material from water and control means, adapted to control entry of said solid particulate material into said cylindrical cage.

Recirculation of solid particulate matter from said chamber to said rotatably mounted cylindrical cage is achieved by the use of pumping means comprised in said first recirculation means, wherein said pumping means are adapted to deliver said solid particulate matter to said separating means and said control means, adapted to control the re-entry of said solid particulate matter into said rotatably mounted cylindrical cage.

Preferably, said apparatus additionally includes a second recirculation means, allowing for the return of water separated by said separating means to said second chamber, thereby facilitating re-use of said water in an environmentally beneficial manner. Preferably, said chamber comprises additional pumping means to promote circulation and mixing of the contents thereof.

In a typical operation of a cleaning cycle according to the method of the invention, soiled garments are first placed into said rotatably mounted cylindrical cage. Tumbling begins (G<1) and, then, the necessary amount of wash water, together with any required additional cleaning agent, are added to said rotatably mounted cylindrical cage. When the substrate has been uniformly wetted out (typically 1-2 minutes), the solid particulate cleaning material is also added to the rotatably mounted cylindrical cage. Optionally, said materials are introduced via the first recirculation means into the cylindrical cage. Alternatively, said cleaning agent may, for example, be pre-mixed with said wash water and added via said separating means located adjacent said cylindrical cage.

During the course of agitation by rotation of the cage, the fluids and a quantity of the solid particulate material exit through the perforations in the cage and into a second chamber of the apparatus. Thereafter, the solid particulate material may be re circulated via the first recirculation means such that it is transferred to said separating means, from which it is returned, in a manner controlled by said control means, to the cylindrical cage for continuation of the washing operation. This process of continuous circulation of the solid particulate material continues throughout the washing operation until cleaning is completed.

Thus, the solid particulate material which exits through the perforations in the walls of said rotatably mounted cylindrical cage and into said second chamber is recirculated and reintroduced through said separation means and, by operation of control means, back into said cage, thereby to continue the cleaning operation.

Typically, a wash cycle according the method of the invention comprises the steps of:
  (i) introducing a solid particulate cleaning material and water into a second chamber of an apparatus as hereinbefore described;
  (ii) agitating said solid particulate cleaning material and water;
  (iii) loading at least one soiled substrate into said rotatably mounted cylindrical cage via access means;
  (iv) closing the access means so as to provide a substantially sealed system;
  (v) causing the rotatably mounted cylindrical cage to rotate whilst introducing said wash water and any required additional cleaning agent to uniformly wet out the substrate;
  (vi) introducing said solid particulate cleaning material into said rotatably mounted cylindrical cage, and operating the apparatus for a wash cycle, wherein said rotatably mounted cylindrical cage continues to rotate, and wherein fluids and solid particulate cleaning material are caused to fall through perforations in said rotatably mounted cylindrical cage into said second chamber in a controlled manner;
  (vii) operating fresh pumping means so as to transfer fresh solid particulate cleaning material and recycle used solid particulate cleaning material to separating means;
  (viii) operating control means so as to add said fresh and recycled solid particulate cleaning material to said rotatably mounted cylindrical cage in a controlled manner; and
  (ix) continuing with steps (vi), (vii) and (viii) as required to effect cleaning of the soiled substrate.

Optionally, said solid particulate cleaning material and water may be introduced into said rotatably mounted cylindrical cage via recirculating means. More preferably, however, said water is introduced into said rotatably mounted cylindrical cage via dosing means such as, for example, a fixedly mounted spray nozzle. Most conveniently, said spray nozzle may be fixedly mounted on said access means.

Preferably, additional cleaning agents are employed in said method, as further discussed below. Said additional cleaning agents may be added to said second chamber of said apparatus with said solid particulate cleaning material and introduced, via the first recirculation means, into the cylindrical cage. Alternatively, an additional cleaning agent is pre-mixed with water and added to said cylindrical cage via the separating means during step (v). More preferably, however, said additional cleaning agents are added to said cylindrical cage via said dosing means. The method of the invention facilitates the use of reduced quantities of said additional cleaning agents.

In preferred embodiments of the invention, said cleaning agents may be added to said cylindrical cage in multiple dosing steps during the cleaning operation, rather than a single dosing step.

Preferably, pumping of said fresh and recycled solid particulate cleaning material proceeds at a rate sufficient to maintain approximately the same level of cleaning material in said rotatably mounted cylindrical cage throughout the cleaning operation, and to ensure that the ratio of cleaning material to soiled substrate stays substantially constant until the wash cycle has been completed.

On completion of the wash cycle, feeding of solid particulate cleaning material into the rotatably mounted cylindrical cage ceases and the speed of rotation of the cage is gradually increased in order to effect a measure of drying of the cleaned substrate. Some solid particulate material is removed at this stage. Typically, the cage is rotated at a rotation speed of between 100 and 800 rpm in order to achieve drying; for a 98 cm diameter cage, a suitable speed of rotation would be around 600 rpm. Subsequently, rotation speed is reduced and returned to the speed of the wash cycle so as to allow for final removal of the solid particulate cleaning material. After separation, the solid particulate cleaning material may be recovered in order to allow for re-use in subsequent cleaning processes.

Optionally, following initial drying at high rpm, said method may additionally comprise a rinsing operation, wherein additional water may be added to said rotatably mounted cylindrical cage in order to effect complete removal of any additional cleaning agent employed in the cleaning operation. Water may be added to said cylindrical cage via said separating means, or via dosing means such as, for example, a fixedly mounted spray nozzle. Most conveniently, said spray nozzle may be fixedly mounted on said access means. Water may also be added to said cylindrical cage by overfilling the second chamber of said apparatus with water such that it enters the first chamber and thereby enters into said rotatably mounted cylindrical cage. Following rotation at the same speed as during the wash cycle, water is removed from said cage by allowing the water level to fall, as appropriate, and again increasing the speed of rotation to, typically, 100-800 rpm in order to achieve a measure of drying of the substrate; a speed of rotation of around 600 rpm would, once again, be appropriate for a 98 cm diameter cage. Said rinsing and drying cycles may be repeated as often as desired.

Optionally, said rinse cycle may be used for the purposes of substrate treatment, involving the addition of treatment agents such as fluorescent brighteners, perfumes, softeners and starch to the rinse water.

Said solid particulate cleaning material is preferably subjected to a cleaning operation in said second chamber by sluicing said chamber with clean water in the presence or absence of a cleaning agent, which may be selected from at least one of surfactants, enzymes and bleaches. Alternatively, cleaning of the solid particulate cleaning material may be achieved as a separate stage in said rotatably mounted cylindrical cage. After cleaning, the solid particulate cleaning material is recovered such that is available for use in subsequent cleaning processes.

Generally, any remaining solid particulate cleaning material on said at least one substrate may be easily removed by shaking the at least one substrate. If necessary, however, further remaining solid particulate cleaning material may be removed by suction means, preferably comprising a vacuum wand.

The method of the invention may be applied to the cleaning of any of a wide range of substrates including, for example, plastics materials, leather, paper, cardboard, metal, glass or wood. In practice, however, said method is principally applied to the cleaning of substrates comprising textile fibres and fabrics, and has been shown to be particularly successful in achieving efficient cleaning of textile fabrics which may, for example, comprise either natural fibres, such as cotton, or man-made and synthetic textile fibres, for example nylon 6,6, polyester, cellulose acetate, or fibre blends thereof.

Most typically, the solid particulate cleaning material comprises a multiplicity of polymeric particles which comprise polyamide or polyester particles, most particularly particles of nylon, polyethylene terephthalate or polybutylene terephthalate, or copolymers thereof, most preferably in the form of beads. The polymers may be foamed or unfoamed, and may be linear or crosslinked. Various nylon or polyester homo- or co-polymers may be used including, but not limited to, Nylon 6, Nylon 6,6, polyethylene terephthalate and polybutylene terephthalate. Preferably, the nylon comprises Nylon 6,6 homopolymer having a molecular weight in the region of from 5000 to 30000 Daltons, preferably from 10000 to 20000 Daltons, most preferably from 15000 to 16000 Daltons. The polyester will typically have a molecular weight corresponding to an intrinsic viscosity measurement in the range of from 0.3-1.5 dl/g as measured by a solution technique such as ASTM D-4603.

Optionally, the properties of the copolymers may be adapted, for example in order to attract particular staining materials, by including monomer units in the polymer chain which, inter alia, are ionically charged, or include polar moieties or unsaturated organic groups. Examples of such groups may include, for example, acid or amino groups, or salts thereof, or pendant alkenyl groups.

The volume of wash water added to the system is calculated so as to achieve a wash water to fabric ratio which is typically between 5.0:1 and 0.1:1 w/w; more typically, the ratio is between 2.0:1 and 0.8:1, with particularly favourable results having been achieved at ratios such as 1.75:1, 1.5:1, 1.2:1 and 1.1:1. Most conveniently, the required amount of water is introduced into the rotatably mounted cylindrical cage of the apparatus after loading of the soiled substrate into said cage. An additional amount of water will migrate into the cage during the circulation of the solid particulate cleaning material, but the amount of carry over is minimised by the action of the separating means.

Whilst, in one embodiment, the method of the invention envisages the cleaning of a soiled substrate by the treatment of a moistened substrate with a formulation which essentially consists only of a multiplicity of polymeric particles, in the absence of any further additives, in more preferred embodiments the formulation additionally comprises at least one additional cleaning agent. Said at least one cleaning agent preferably comprises at least one detergent composition.

The principal components of the detergent composition comprise cleaning components and post-treatment components. Typically, the cleaning components comprise surfactants, enzymes and bleach, whilst the post-treatment components include, for example, anti-redeposition additives, perfumes and optical brighteners.

However, the detergent formulation may optionally include one or more other additives such as, for example builders, chelating agents, dye transfer inhibiting agents, dispersants, enzyme stabilizers, catalytic materials, bleach activators, polymeric dispersing agents, clay soil removal agents, suds suppressors, dyes, structure elasticizing agents, fabric softeners, starches, carriers, hydrotropes, processing aids and/or pigments.

Examples of suitable surfactants may be selected from non-ionic and/or anionic and/or cationic surfactants and/or ampholytic and/or zwitterionic and/or semi-polar nonionic surfactants. The surfactant is typically present at a level of from about 0.1%, from about 1%, or even from about 5% by weight of the cleaning compositions to about 99.9%, to about 80%, to about 35%, or even to about 30% by weight of the cleaning compositions.

The compositions may include one or more detergent enzymes which provide cleaning performance and/or fabric care benefits. Examples of suitable enzymes include, but are not limited to, hemicellulases, peroxidases, proteases, other cellulases, other xylanases, lipases, phospholipases, esterases, cutinases, pectinases, keratanases, reductases, oxidases, phenoloxidases, lipoxygenases, ligninases, pullulanases, tannases, pentosanases, malanases, [beta]-glucanases, arabinosidases, hyaluronidase, chondroitinase, laccase, mannanase and amylases, or mixtures thereof. A typical combination may comprise a mixture of enzymes such as protease, lipase, cutinase and/or cellulase in conjunction with amylase.

Optionally, enzyme stabilisers may also be included amongst the cleaning components. In this regard, enzymes for use in detergents may be stabilised by various techniques, for example by the incorporation of water-soluble sources of calcium and/or magnesium ions in the compositions.

The compositions may include one or more bleach compounds and associated activators. Examples of such bleach compounds include, but are not limited to, peroxygen compounds, including hydrogen peroxide, inorganic peroxy salts, such as perborate, percarbonate, perphosphate, persilicate, and mono persulphate salts (e.g. sodium perborate tetrahydrate and sodium percarbonate), and organic peroxy acids as peracetic acid, monoperoxyphthalic acid, diperoxydodecanedioic acid, N,N'-terephthaloyl-di(6-aminoperoxycaproic acid), N,N'-phthaloylaminoperoxycaproic acid and amidoperoxyacid. Bleach activators include, but are not limited to, carboxylic acid esters such as tetraacetylethylenediamine and sodium nonanoyloxybenzene sulfonate.

Suitable builders may be included in the formulations and these include, but are not limited to, the alkali metal, ammonium and alkanolammonium salts of polyphosphates, alkali metal silicates, alkaline earth and alkali metal carbonates, aluminosilicates, polycarboxylate compounds, ether hydroxypolycarboxylates, copolymers of maleic anhydride with ethylene or vinyl methyl ether, 1,3,5-trihydroxybenzene-2,4,6-trisulphonic acid, and carboxymethyl-oxysuccinic acid, various alkali metal, ammonium and substituted ammonium salts of polyacetic acids such as ethylenediamine tetraacetic acid and nitrilotriacetic acid, as well as polycarboxylates such as mellitic acid, succinic acid, oxydisuccinic acid, polymaleic acid, benzene 1,3,5-tricarboxylic acid, carboxymethyloxysuccinic acid, and soluble salts thereof.

The compositions may also optionally contain one or more copper, iron and/or manganese chelating agents and/or one or more dye transfer inhibiting agents.

Suitable polymeric dye transfer inhibiting agents include, but are not limited to, polyvinylpyrrolidone polymers, polyamine N-oxide polymers, copolymers of N-vinylpyrrolidone and N-vinylimidazole, polyvinyloxazolidones and polyvinylimidazoles or mixtures thereof.

Optionally, the detergent formulations can also contain dispersants. Suitable water-soluble organic materials are the homo- or co-polymeric acids or their salts, in which the polycarboxylic acid may comprise at least two carboxyl radicals separated from each other by not more than two carbon atoms.

Said anti-redeposition additives are physico-chemical in their action and include, for example, materials such as polyethylene glycol, polyacrylates and carboxy methyl cellulose.

Optionally, the compositions may also contain perfumes Suitable perfumes are generally multi-component organic chemical formulations which can contain alcohols, ketones, aldehydes, esters, ethers and nitrile alkenes, and mixtures thereof. Commercially available compounds offering sufficient substantivity to provide residual fragrance include Galaxolide (1,3,4,6,7,8-hexahydro-4,6,6,7,8,8-hexamethyl-cyclopenta(g)-2-benzopyran), Lyral(3- and 4-(4-hydroxy-4-methyl-pentyl)cyclohexene-1-carboxaldehyde and Ambroxan((3aR,5aS,9aS,9bR)-3a,6,6,9a-tetramethyl-2,4,5, 5a,7,8,9,9b-octahydro-1H-benzo[e][1] benzofuran). One example of a commercially available fully formulated perfume is Amour Japonais supplied by Symrise® AG.

Suitable optical brighteners fall into several organic chemical classes, of which the most popular are stilbene derivatives, whilst other suitable classes include benzoxazoles, benzimidazoles, 1,3-diphenyl-2-pyrazolines, coumarins, 1,3,5-triazin-2-yls and naphthalimides. Examples of such compounds include, but are not limited to, 4,4'-bis[[6-anilino-4(methylamino)-1,3,5-triazin-2-yl]amino]stilbene-2,2'-disulfonic acid, 4,4'-bis[[6-anilino-4-[(2-hydroxyethyl) methylamino]-1,3,5-triazin-2-yl]amino]stilbene-2,2'-disulphonic acid, disodium salt, 4,4'-Bis[[2-anilino-4-[bis(2-hydroxyethyl)amino]-1,3,5-triazin-6-yl]amino]stilbene-2, 2'-disulfonic acid, disodium salt, 4,4'-bis[(4,6-dianilino-1,3, 5-triazin-2-yl)amino]stilbene-2,2'-disulphonic acid, disodium salt, 7-diethylamino-4-methylcoumarin, 4,4'-Bis [(2-anilino-4-morpholino-1,3,5-triazin-6-yl)amino]-2,2'-stilbenedisulfonic acid, disodium salt, and 2,5-bis(benzoxazol-2-yl)thiophene.

Said agents may be used either alone or in any desired combination and may be added to the cleaning system at appropriate stages during the cleaning cycle in order to maximise their effects.

In any event, however, when the method of the invention is performed in the presence of at least one additional cleaning agent, the quantity of said cleaning agent required in order to achieve satisfactory cleaning performance is significantly reduced from the quantities required with the methods of the prior art.

The ratio of solid particulate cleaning material to substrate is generally in the range of from 0.1:1 to 10:1 w/w, typically in the region of from 0.5:1 to 5:1 w/w, with particularly favourable results being achieved with a ratio of between 1:1 and 3:1 w/w, and especially at around 2:1 w/w. Thus, for example, for the cleaning of 5 g of fabric, 10 g of polymeric particles, optionally coated with surfactant, would be employed in one embodiment of the invention. The ratio of solid particulate cleaning material to substrate is maintained at a substantially constant level throughout the wash cycle.

The method of the present invention may be used for either small or large scale batchwise processes and finds application in both domestic and industrial cleaning processes.

As previously noted, the method of the invention finds particular application in the cleaning of textile fabrics. The conditions employed in such a cleaning system do, however, allow the use of surprisingly lower wash temperatures from those which typically apply to the conventional wet cleaning of textile fabrics and, as a consequence, offer significant environmental and economic benefits. Thus, typical procedures and conditions for the wash cycle require that fabrics are generally treated according to the method of the invention at, for example, temperatures of between 5 and 40° C. for a duration of between 5 and 45 minutes in a substantially sealed system. As an approximate guide, it is found that if a conventional aqueous cleaning process requires a wash temperature of T° C., then the process according to the present invention will provide superior cleaning at temperatures in the range of T-10° C. to T-25° C. Thereafter, additional time is required for the completion of the rinsing and bead separation stages of the overall process, so that the total duration of the entire cycle is typically in the region of 1 hour.

The results obtained are very much in line with those observed when carrying out conventional wet (or dry) cleaning procedures with textile fabrics. The extent of cleaning and stain removal achieved with fabrics treated by the method of the invention is seen to be very good, with particularly outstanding results being achieved in respect of hydrophobic stains and aqueous stains and soiling, which are often difficult to remove. The energy requirement, the total volume of water used, and the detergent consumption of the method of the invention are all significantly lower than those levels associated with the use of conventional aqueous washing procedures, again offering significant advantages in terms of cost and environmental benefits.

The method of the invention also shows benefits in terms of reducing washing-related fabric damage. As previously observed, fabric creasing readily occurs in conventional aqueous washing, and this acts to concentrate the stresses from the mechanical action of the wash at each crease, resulting in localised fabric damage. Prevention of such fabric damage (or fabric care) is of primary concern to the domestic consumer and industrial user. The addition of polymeric particles according to the method of the invention provides effective cleaning but, at the same time, uniform and gentle mechanical interaction with the fabric, thereby reducing fabric damage when compared with conventional aqueous processes. It is, in particular, the uniformity of the mechanical action generated by the chosen particles across the entire fabric surface that is the key factor in this regard. The presence of the particles also effectively reduces creasing in the wash by acting as a pinning layer on the fabric surface in order to help prevent folding. The particles also inhibit interaction between separate pieces of fabric in the wash by acting as a separation or spacing layer, thereby reducing entanglement. Both folding and entanglement are major causes of localised fabric damage in conventional aqueous processes. It is the localised aspect of the damage that determines the lifetime of a garment under multiple washing.

Thus, the method of the present invention provides for enhanced cleaning performance in comparison with the methods of the prior art at lower energy, water and detergent conditions; alternatively, equivalent cleaning performance may be achieved at even lower levels of all of energy water and detergent, together with reduced fabric damage (see Examples). Removal of the beads from the fabric washload at the end of the cleaning process is expedited on the basis of the specific size, shape and density of the beads used, and also by control of process parameters, in order to enable bead re-use in subsequent cleaning processes.

In a specific preferred embodiment of the invention, a soiled substrate is placed in a rotatably mounted cylindrical cage of 98 cm diameter and a detergent formulation comprising surfactant and enzymes is added in combination with a small amount of wash water art ambient temperature via a spray nozzle mounted on the door of the apparatus. The cage is rotated at 40 rpm to give a G force of 0.88. Thereafter, the solid particulate cleaning material, typically in the form of polymeric beads, is introduced into said cage from said second chamber and the process, comprising continuous recirculation of said material, is continued for 5-50 minutes. A further amount of wash water containing bleach is added during this time at either ambient or elevated temperature (in the former instance, the bleach is a low temperature activated compound). Rotation is continued for several minutes after the bleach solution has been added. Circulation is then discontinued in order to end the wash process.

The extraction stage of the cycle is then carried out in order to remove water from the system, by rotating for about 2 minutes at a high G force of greater than 5.5; preferably, said cage is rotated at about 600 rpm in order to generate a G force of around 197.2. High speed rotation then ceases and a low G tumble (at around 40 rpm) is carried out for approximately 5 minutes to remove the majority (>50%) of the solid particulate cleaning material remaining in the washload. Rinse water is then sprayed into said cage via the nozzle for a few minutes, after which further rotation of the cage at around 600 rpm takes place to remove the rinse water. The rinse process may be repeated several times, generally up to 10 times, more preferably up to 5 times, typically around 3 times. The rinse water which is added is not sufficient to submerge the fabric in water, and is only used to the extent of resaturating the fabric ahead of the next extraction stage. Optionally, fluorescent brighteners, perfumes, conditioners and the like may be added during the course of the final spray rinse, following which the cage is again rotated at low G (40 rpm) in order to allow for removal of the remaining solid particulate cleaning material. The clean fabric may then be removed from the apparatus.

Further, in a typical example of an operating cycle according to the method of the invention, an initial addition of water and solid particulate cleaning material (approximately 43 kg) is added to a washload of soiled substrate (15 kg) in a 98 cm diameter rotatably mounted cylindrical cage, whilst rotating to generate 0.88 G (40 rpm). Thereafter, further solid particulate cleaning material (10 kg) is pumped into said rotatably mounted cylindrical cage via the separating means and control means approximately every 30 seconds throughout the duration of the wash cycle which may typically continue for around 30 minutes. The system is thereby designed to pump and add solid particulate cleaning material at a sufficient rate to maintain roughly the same level of solid particulate cleaning material in the rotatably mounted cylindrical cage (about 2.9:1 by weight, for 43 kg of beads and 15 kg of fabric) throughout the wash.

Thus, during the wash cycle, the solid particulate cleaning material is continually falling out of the rotatably mounted cylindrical cage through its perforations, and is being recycled and added, together with fresh cleaning material, via the separating means and control means. This process may either be controlled manually, or operated automatically. The rate of exit of the solid particulate cleaning material from the rotatably mounted cylindrical cage is essentially controlled by means of its specific design. The key parameters in this regard include the size of the perforations, the number of perforations, the arrangement of the perforations within the cage, and the G force (or rotational speed) which is employed.

Generally, the perforations are sized at around 2-3 times the average particle diameter of the solid particulate cleaning material which, in a typical example, results in perforations having a diameter of no greater than 25.0 mm. In a preferred embodiment of the invention, a rotatably mounted cylindrical cage would be drilled so that only around 34% of the surface area of the cylindrical walls of the cage comprises perforations. Preferably, the perforations are banded in stripes or distributed evenly over the cylindrical walls of the rotatably mounted cylindrical cage, but could be exclusively located, for example, in one half of the cage.

The rate of exit of the solid particulate cleaning material from the rotatably mounted cylindrical cage is also affected by the speed of rotation of said cage, with higher rotation speeds increasing the G force, although at G>1 the fabric adheres to the sides of the cage and prevents exit of the cleaning material. Hence, slower rotational speeds have been found to provide optimum results in this regard, as they allow the beads to fall from the fabric and through the perforations as the fabric opens out more during tumbling. Rotational speeds resulting in a G force of <1 are therefore required (10-42 rpm in a 98 cm diameter cage). The G force (or rotational speed) is also controlled so as to maximise the beneficial effect of the mechanical action of the cleaning material on the substrate, and the most suitable G is generally found to be in the region of 0.9 G (40 rpm in a 98 cm diameter cage).

In addition, the moisture level in the wash also has an effect, with wetter substrates tending to retain cleaning material for a longer time than drier substrates. Consequently, overwetting of substrate can, if necessary, be employed in order to further control the rate of exit of solid particulate cleaning material.

On completion of the wash cycle, addition of solid particulate cleaning material to the rotatably mounted cylindrical cage is ceased, and the cage rpm is gradually increased to give a G force of about 197.2 (600 rpm in a 98 cm diameter cylindrical cage) for about 2 minutes in order to extract some liquid and dry the substrate to an extent. High speed rotation then ceases and a low G tumble (at around 40 rpm) is carried out for approximately 5 minutes to remove the majority (>50%) of the solid particulate cleaning material remaining in the washload. The rinsing cycles are then carried out as hereinbefore described and the rotation G and rotational speed are finally returned to the same values of <1 and low (40) rpm as in the wash cycle in order to complete the removal of cleaning material; this removal of beads generally takes around 20 minutes, as do each of the wash and rinse cycles in a typical operation, giving a total overall cycle time in the region of 1 hour.

The method of the invention has been shown to be successful in the removal of cleaning material from the cleaned substrate after processing and tests with polyester beads, and nylon beads comprising either Nylon 6 or Nylon 6,6 polymer, have indicated bead removal efficacy such that on average <150 beads per washload remain at the end of the bead separation cycle. Generally, this can be further reduced to an average of <40 beads per washload and, in optimised cases wherein a 20 minute separation cycle is employed in combination with specific bead types, an average of <5 beads per washload can be achieved. With drier garments, achieved using higher G forces during the water extraction stage of the process, this bead per garment figure can be even further reduced.

Additionally, it has been demonstrated that re-utilisation of the polymer particles in the manner described operates well, so that particles can be satisfactorily re-used in the cleaning procedure, even though some deterioration in performance is generally observed with recycled particles.

The invention will now be further illustrated, though without in any way limiting the scope thereof, by reference to the following examples and associated illustrations.

EXAMPLES

Example 1—Cleaning Performance

Woven cotton fabric (194 gm$^{-2}$, Whaleys, Bradford, U.K.) was stained with coffee, lipstick, ball point pen, tomato ketchup, boot polish, grass, vacuum dirt, curry sauce and red wine following the methods described below:

(i) Coffee 10 g of Morrisons® Full Roast coffee powder was dissolved in 50 ml distilled water at 70° C. A 1 cm$^3$ aliquot of the ensuing solution was applied to the fabric using a synthetic sponge, within the confines of a 5 cm diameter circular plastic template; the stained fabric was then allowed to dry at ambient temperature (23° C.), after which the fabric was aged prior to use, by storage in the dark for 4 days.

(ii) Lipstick

Revlon® Super Lustrous lipstick (copper frost shade) was applied to the fabric using a synthetic sponge to provide a uniform coverage within the confines of a 5 cm diameter circular plastic template. The fabric was then aged following the procedure recounted for coffee.

(iii) Ball Point Pen

A black Paper Mate® Flex Grip Ultra ball point pen was used to uniformly cover the fabric within the confines of a 5 cm diameter circular plastic template. The fabric was then aged following the procedure recounted for coffee.

(iv) Tomato Ketchup

Heinz® tomato ketchup was applied to the fabric using a synthetic sponge to provide a uniform coverage within the confines of a 5 cm diameter circular plastic template. The fabric was then aged following the procedure recounted for coffee.

(v) Boot Polish

Kiwi® black boot polish was applied to the fabric using a synthetic sponge to provide a uniform coverage within the confines of a 5 cm diameter circular plastic template. The fabric was then aged following the procedure recounted for coffee.

(vi) Grass

Grass was collected manually from an MG7 (National Vegetation Classification) source. 10 g of the grass was chopped with scissors and blended with 200 ml of tap water using an electronic blender. The mixture was then filtered using a metal sieve, and the filtrate used as the staining medium. This was applied to the fabric using a synthetic sponge to provide a uniform coverage within the confines of a 5 cm diameter circular plastic template. The fabric was then aged following the procedure recounted for coffee.

(vii) Vacuum Dirt

Vacuum dirt was collected manually from a general domestic vacuum bag. 25 g of vacuum dirt was mixed with 100 ml of tap water, and the mixture used to stain the fabric. This was applied to the fabric using a synthetic sponge to provide a uniform coverage within the confines of a 5 cm diameter circular plastic template. The fabric was then aged following the procedure recounted for coffee.

(viii) Curry Sauce

Morrisons® own brand curry sauce was applied directly to the fabric using a synthetic sponge to provide a uniform coverage within the confines of a 5 cm diameter circular plastic template. The fabric was then aged following the procedure recounted for coffee.

(ix) Red Wine

"Spanish Red Wine" purchased at Morrisons® was applied directly to the fabric using a synthetic sponge to provide a uniform coverage within the confines of a 5 cm diameter circular plastic template. The fabric was then aged following the procedure recounted for coffee.

Each of the stains (i)-(ix) was applied to a single (36 cm×30 cm) piece of cotton fabric in the pattern described in FIG. 1, to make up a standard stain set.

Cleaning trials were then carried out using a set of trial and control conditions (see Table 1). Thus, the trials involved the use of a preferred apparatus as hereinbefore defined according to the method of the invention ("Xeros" XP5), whilst control cleaning trials were carried out using a standard domestic washing machine (Hotpoint Ultima WT960-XP6, XP7 and XP8). These control cleaning trials were carried out at different temperatures using various levels of detergents (Unilever Persil® Small and Mighty Biological-XP6 and XP7, or Procter & Gamble Ariel® Biological Liquid with Actilift-XP8).

The cleaning performance of the method of the invention at 15° C. (XP5) was therefore compared to controls run in the domestic machine (Hotpoint Ultima WT960) at the same temperature (XP6), and also at 40° C. (XP7). An equivalent detergent dosage was used in XP5, XP6 and XP7. As a further control the domestic wash was then repeated at 40° C., but this time with an alternative detergent at a much increased dosage (Ariel® Biological Liquid with Actilift-XP8). This was chosen to provide the best possible cleaning as a control (see Table 2 for detergent details and the recommended dosage from the respective manufacturers).

The domestic washes (XP6, XP7 and XP8) were carried out with 4 kg washloads, even though the Hotpoint Ultima WT960 is rated as a 7 kg machine. This is much more representative of the average washload size used in the European domestic market, for example, and it in turn makes these controls more rigorous. The increased free volume in the drum results in more mechanical action, and a better wash performance.

TABLE 1

WASH TESTS

| Test # | Machine Type | Detergent Dosage (ml) | Washload (kg) | Detergent Dosage (ml/kg) | Wash Temperature (° C.) | Cycle Time (mins) |
|---|---|---|---|---|---|---|
| XP5 | Xeros | 210 | 24 | 8.75 | 15 | 60 |
| XP6 | Domestic | 35 | 4 | 8.75 | 15 | 74 |
| XP7 | Domestic | 35 | 4 | 8.75 | 40 | 90 |
| XP8 | Domestic | 120 | 4 | 30.0 | 40 | 90 |

The method according to the invention as hereinbefore described was carried out using a preferred apparatus having a cylindrical cage of 98 cm diameter with 28.8 liters of wash water (i.e. 1.2 liters/kg washload) and 60 kg of INVISTA 1101 polyester beads (i.e. 2.5 kg/kg washload). No rinsing was employed.

TABLE 2

DETERGENT AND RECOMMENDED DOSAGE DETAILS

| | |
|---|---|
| Unilever Persil ® Small & Mighty | Recommended dosage: 35 ml per 4-5 kg of washload (soft - medium water) |
| Procter & Gamble Ariel ® Biological Liquid with Actilift | Recommended dosage: 120 ml per 4 kg of washload (soft - medium water) |

The standard stain set of nine stains was used in all cases at 1 standard stain set/kg of washload (see FIG. 1). These stains are representative of the range of accidental stain types that can be encountered (enzymatic, oxidisable, greasy, and particulate), and include grass, ketchup, coffee, red wine, ball point pen, curry sauce, ground in dirt, lipstick and boot polish.

In all cases XP5-XP8 a simulated sebum grease stain of 8 g/kg of washload was incorporated into the test as impregnated cotton cloth (SBL-2004 from WFK). This cloth, which starts out a dark grey in colour (FIG. 1), is used to better simulate the domestic washing environment where such collar and cuff grease is the dominant stain (making up some 80% of the overall stain loading). Sebum is derived from the skin's sebaceous glands.

Figure 2:
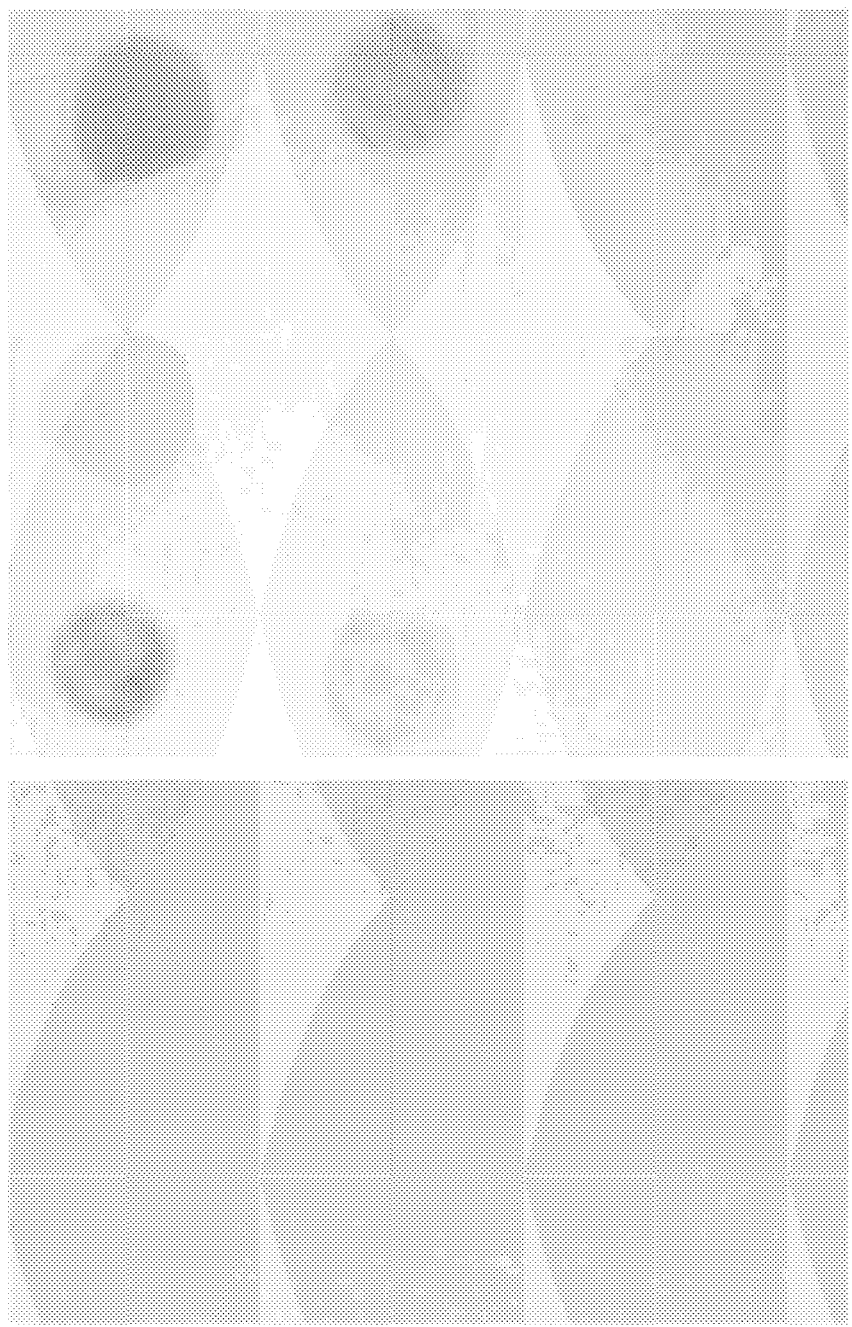
FIG. 2 shows the results of a wash test using an apparatus and method of the invention performed at 15° C. and the detergent Persil® Small & Mighty.

The wash test results are illustrated in the accompanying Figures as follows: FIG. 2 (XP5), FIG. 3 (XP6), FIG. 4 (XP7), FIG. 5 (XP8), FIG. 6 (XP5 versus XP6), and FIG. 7 (XP5 versus XP7).

As can be seen from FIGS. 2, 3 and 6, there is a marked improvement in cleaning performance with the method of the invention when compared to the domestic equivalent at 15° C. wash temperature. All nine of the standard set of stains have cleaned to a greater extent, and in particular the sebum cloth has lightened appreciably in colour. This last observation should not be underestimated, particularly as it could represent a significant enhancement in low temperature grease removal, which has long been a goal of the laundry industry.

Figure 4:
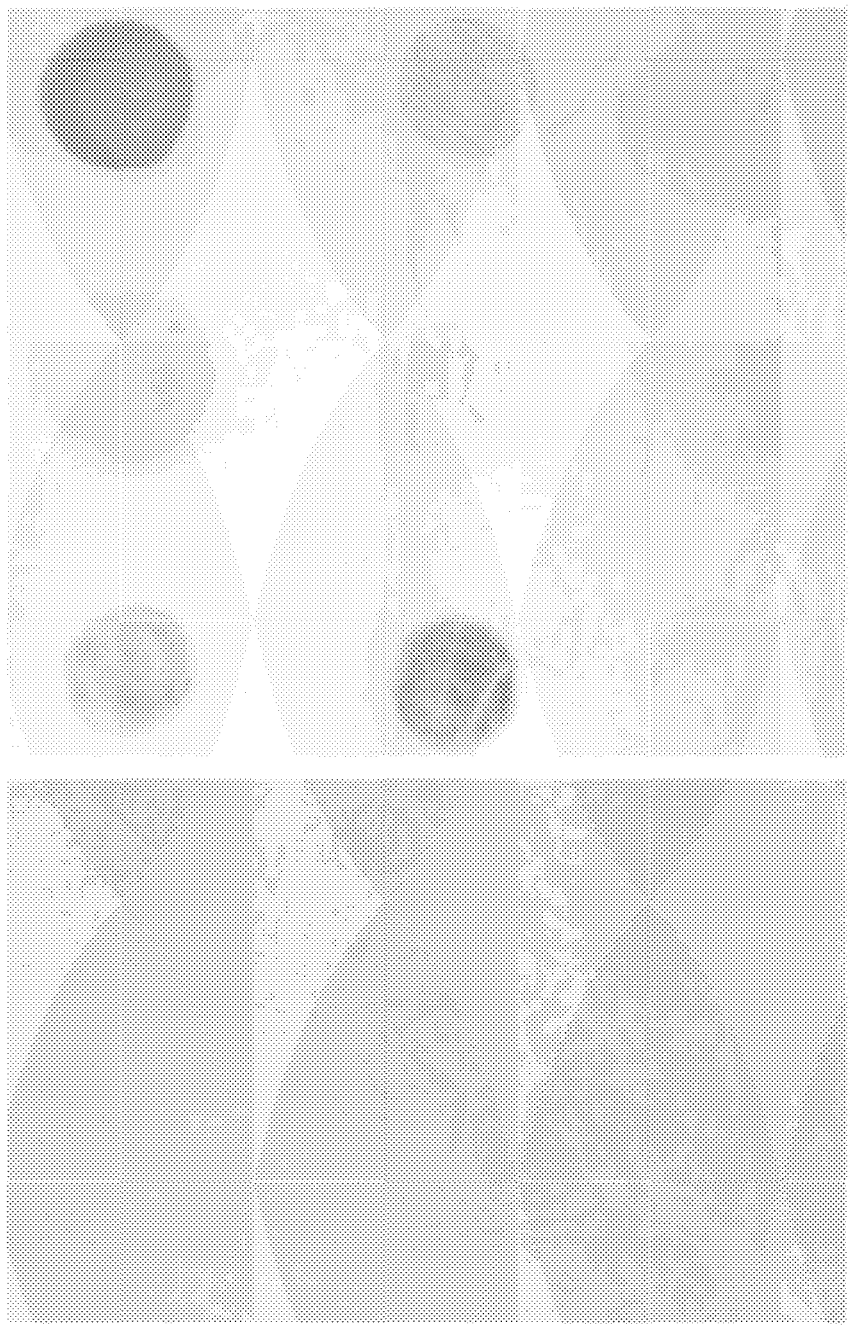
FIG. 4 shows the results of a wash test using a standard domestic washing machine performed at 40° C. and the detergent Persil® Small & Mighty.
Figure 5:
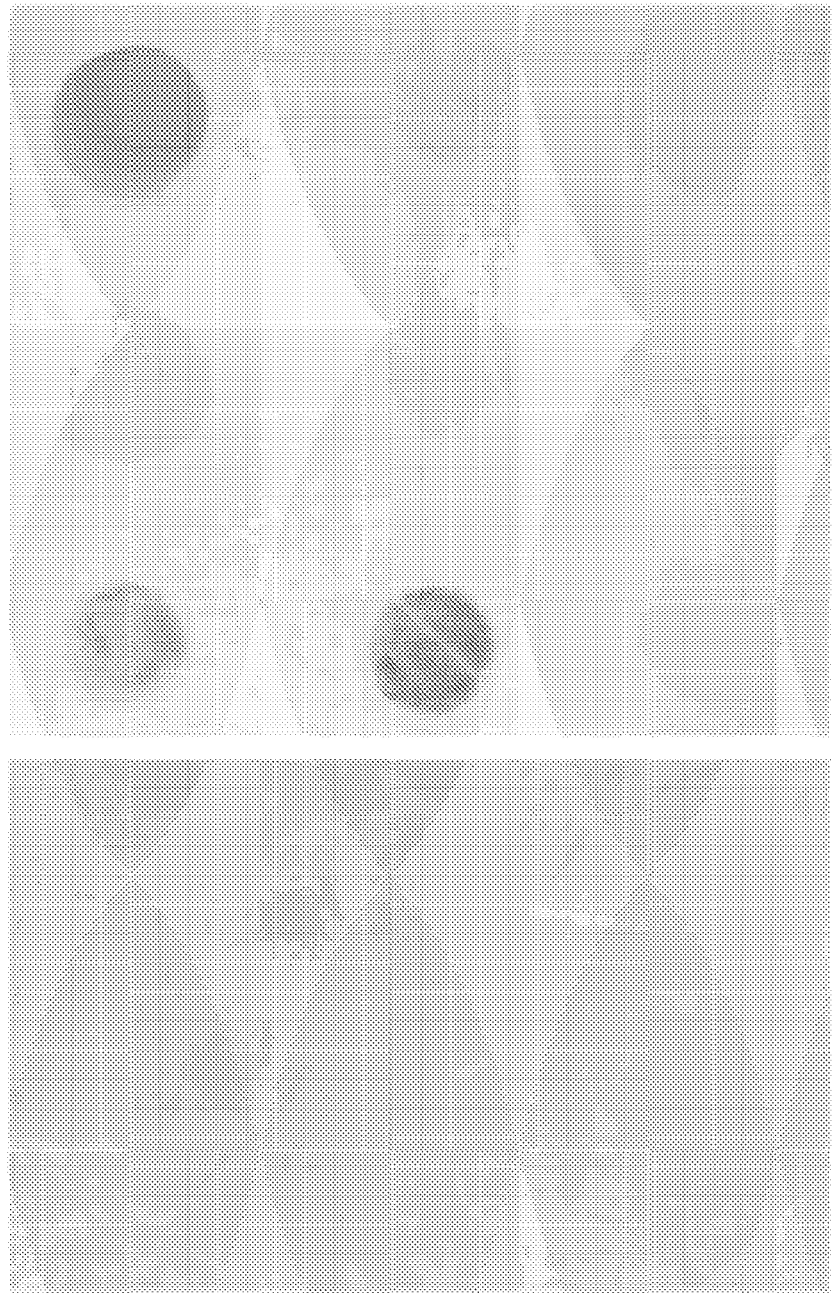
FIG. 5 shows the results of a wash test using a standard domestic washing machine performed at 40° C. and the detergent Arial® Biological Liquid with Actilift.

FIGS. 2, 4 and 7 show that there is at least parity cleaning of all nine standard stains and the sebum cloth for the low temperature wash according to the method of the invention, even compared to the domestic control run at 40° C. This is a very significant potential upside for power saving, and shows the enhancement from bead mechanical action with the method of the invention, which a conventional wash obviously cannot match. Comparison of FIGS. 2 and 5 shows that the same conclusion can be drawn again against a domestic control at 40° C. but here with a significantly higher still detergent dosage/kg.

Example 2—Fabric Care

Figure 8:
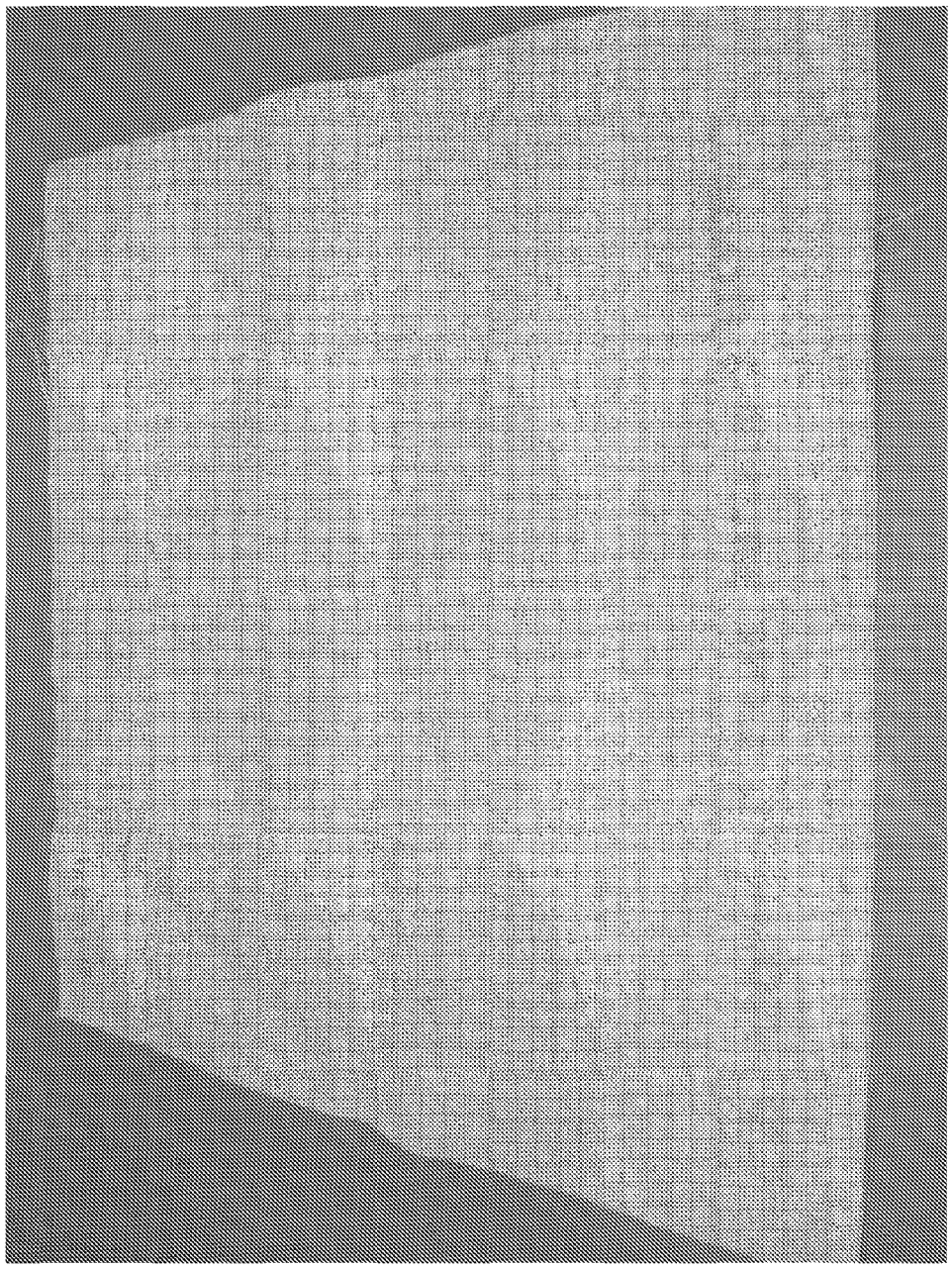
FIG. 8 shows the results of a wash test of a specially manufactured cloth sample using an apparatus and process of the invention.
Figure 9:
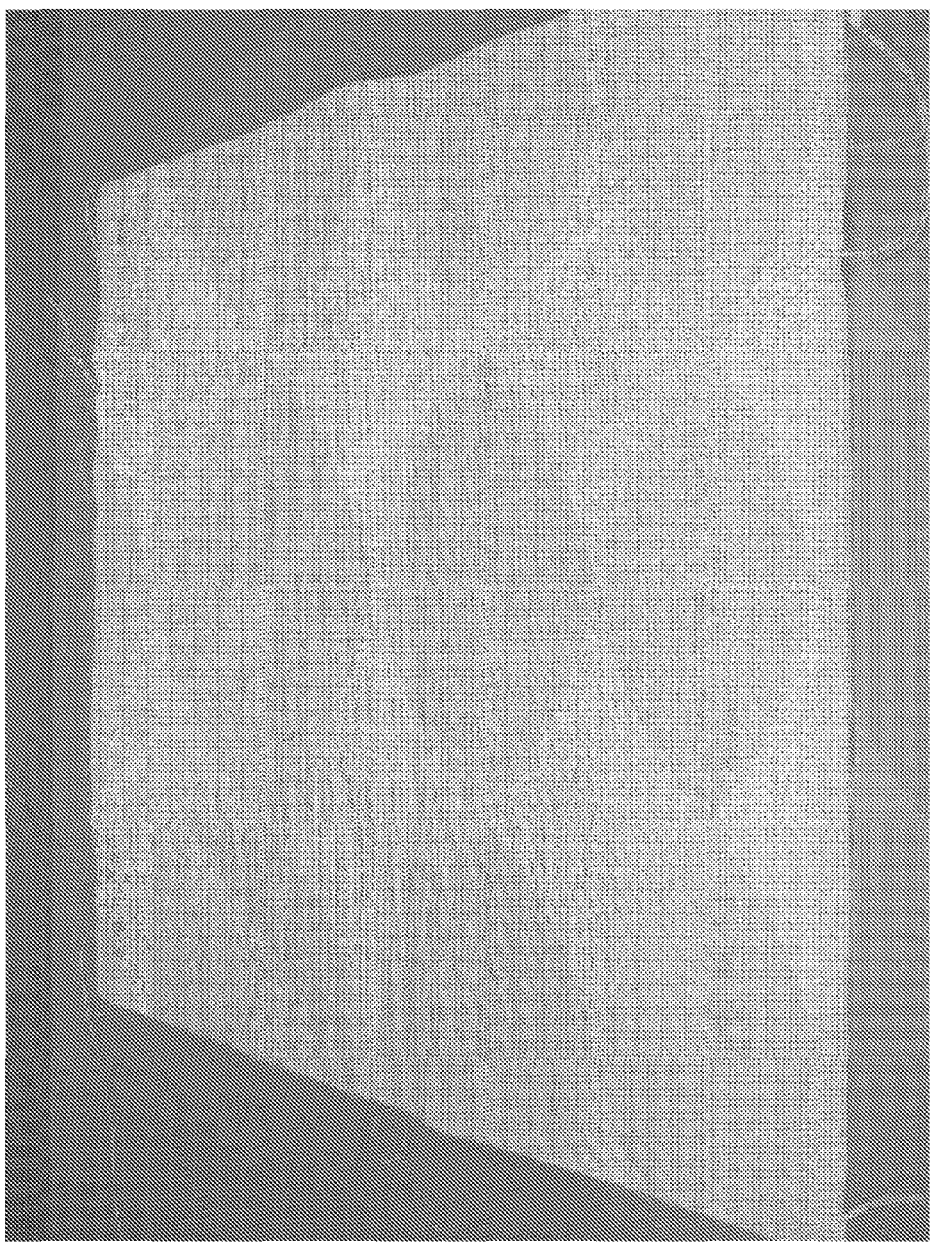
FIG. 9 shows the results of a wash test of a specially manufactured cloth sample using a standard domestic washing machine.

Tests were carried out in order to illustrate the reduced localised fabric damage associated with the method of the present invention. Thus, FIGS. 8 and 9 show the result of washing a specially manufactured cloth sample (EMPA #306 test cloth: "Polka-Dot Type A (low-mid)), which is designed to highlight the effects of mechanical action in the washing process. FIG. 8 is a sample of this cloth after a wash in a preferred apparatus as hereinbefore defined according to the method of the invention, and FIG. 9 is a sample of this cloth after a wash in a conventional domestic washing machine.

The domestic wash was carried out in a BEKO WM5120W machine, on a 40° C. cotton wash cycle at a 1200 rpm spin speed setting, using 4 kg of cotton ballast and 1 EMPA #306 cloth. The detergent used was 80 g of Procter & Gamble Ariel® biological powder (i.e. 20 g/kg) which is the manufacturer's recommended dosage. The process according to the invention was carried out in a preferred apparatus (98 cm cage diameter) with a 24 kg mixed fabric washload, 28.8 liters of wash water (i.e. 1.2 liters/kg washload) and 60 kg of INVISTA 1101 polyester beads (i.e. 2.5 kg/kg washload). The detergent was also Procter & Gamble Ariel® biological powder, but only 192 g (i.e. 8 g/kg) was used—which is 40% of the manufacturer's recommended dosage. A three-rinse process was employed at 300 rpm spin speed.

In this instance, FIG. 9 (BEKO—prior art) shows the removal of the rubber dots adhering to the EMPA #306 cloth surface resulting in an irregular pattern and, in particular, the effects of folding and creasing can be seen, with highly concentrated removal streaks. These can be readily associated with high levels of localised fabric damage. FIG. 8 (method of the invention) shows a totally different removal pattern resulting in an overall higher level of removal but, critically, this is much more uniform. Hence, there is likely to be better cleaning (as shown in other examples here), but significantly less localised fabric damage. It is the localised aspect of the damage that determines the lifetime of a garment under multiple washing, and garment lifetime is obviously a primary benefit to the consumer.

Figure 10:
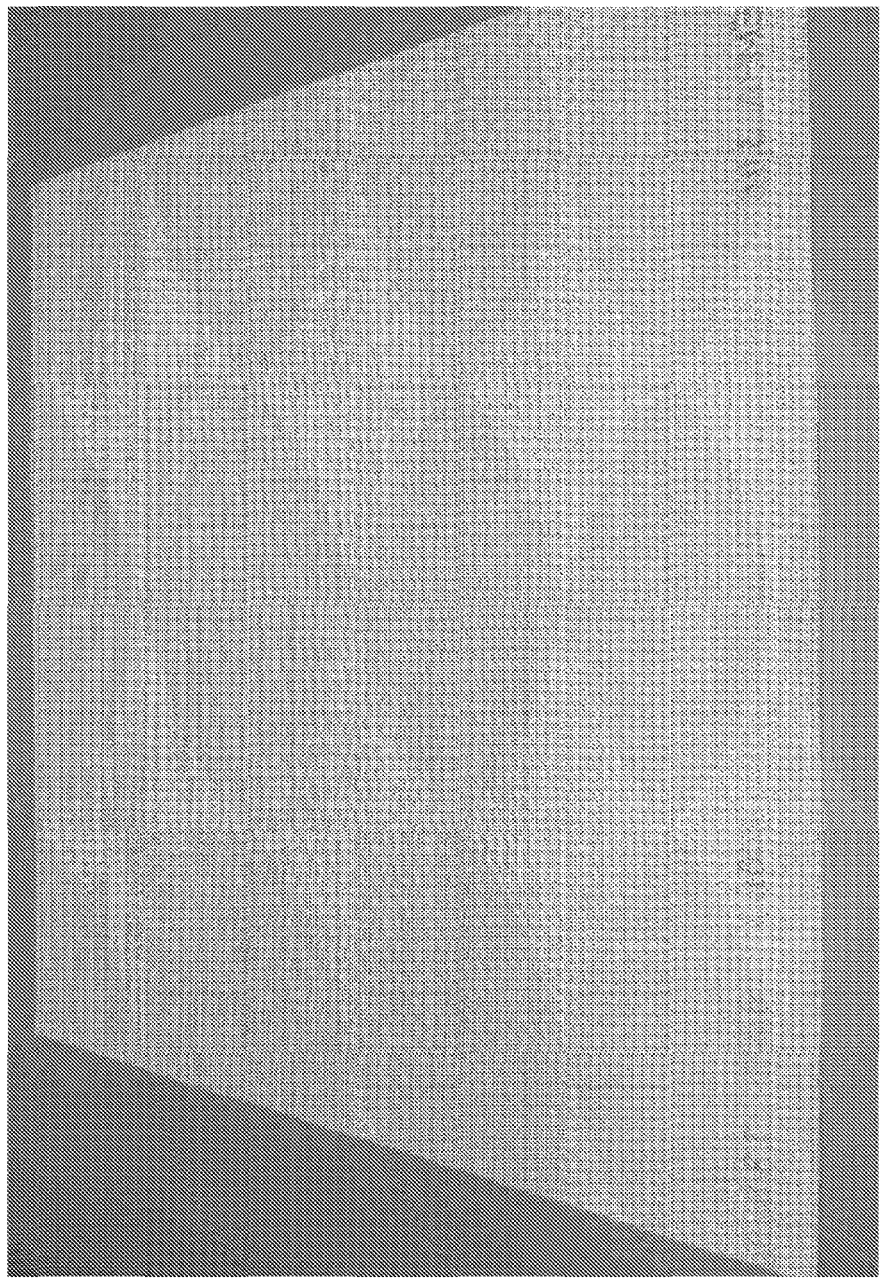
FIG. 10 shows an uncleaned sample of the specially manufactured cloth.

As a comparative illustration, FIG. 10 shows an unwashed sample of the EMPA #306 cloth.

Example 3—Cleaning Performance

Figure 11:
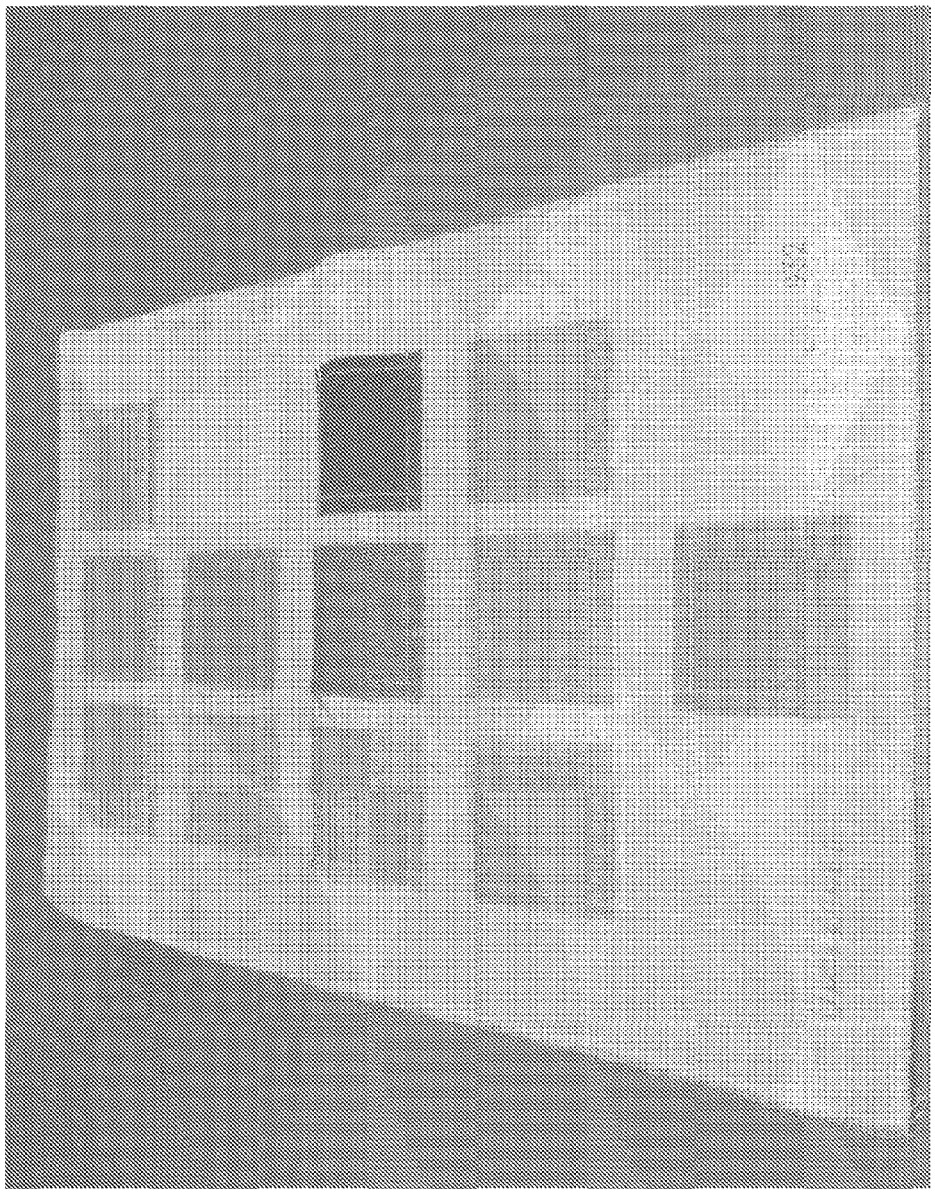
FIG. 11(a) shows an uncleaned commercial laundry stain monitor.
FIG. 11(b) shows a stain key for a commercial laundry stain monitor.

Energy, water and detergent consumption values were determined for the method of the presently claimed invention when using the preferred apparatus (98 cm diameter cage) and compared with values achieved with a Miele PW 6241 EL commercial machine. The results are shown in Table 3. The Miele PW 6241 EL conventional tests were carried out with 12 kg washloads, even though this machine is rated as a 24 kg machine. This was again to make these controls more rigorous, as the increased free volume in the drum results in more mechanical action, and a better wash performance. The detergent used was Procter & Gamble Professional Ariel® Liquid at the manufacturer's recommended dosage of 30 ml/kg. Wash temperatures of 40° C. and 60° C. were used (controls ML1 and ML2 respectively). The washload contained 3 professional commercial laundry stain monitors (PCMS-55_05-05×05 from WFK—see FIGS. 11(*a*) and 11(*b*)), 12 sebum cloths (SBL-2004 from WFK), with the remaining washload made up with cotton ballast.

Figure 12:
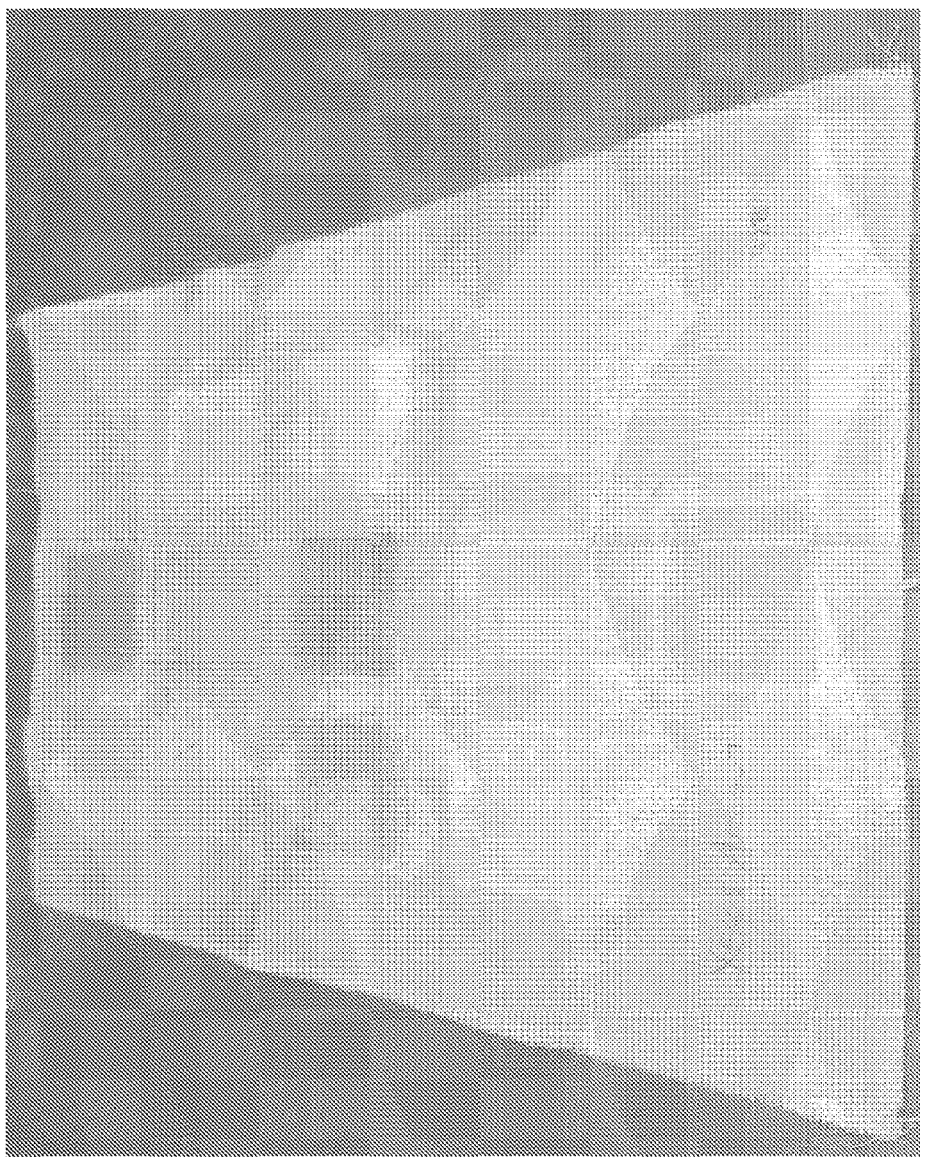
FIG. 12 shows the results of a wash test of a commercial laundry stain monitor using an apparatus and ambient process of the invention.
Figure 13:
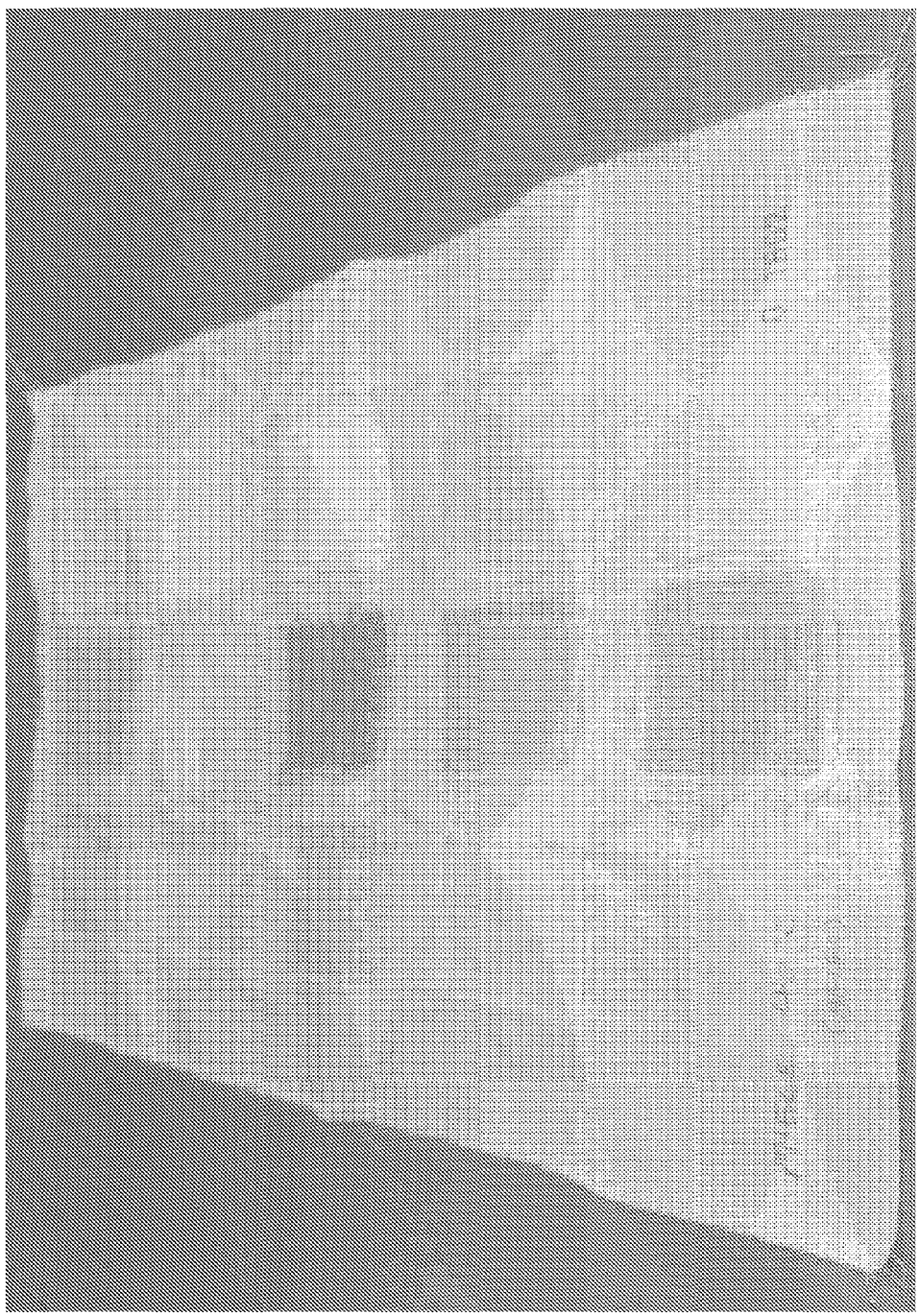
FIG. 13 shows the results of a wash test of a commercial laundry stain monitor using a standard domestic washing machine.
Figure 14:
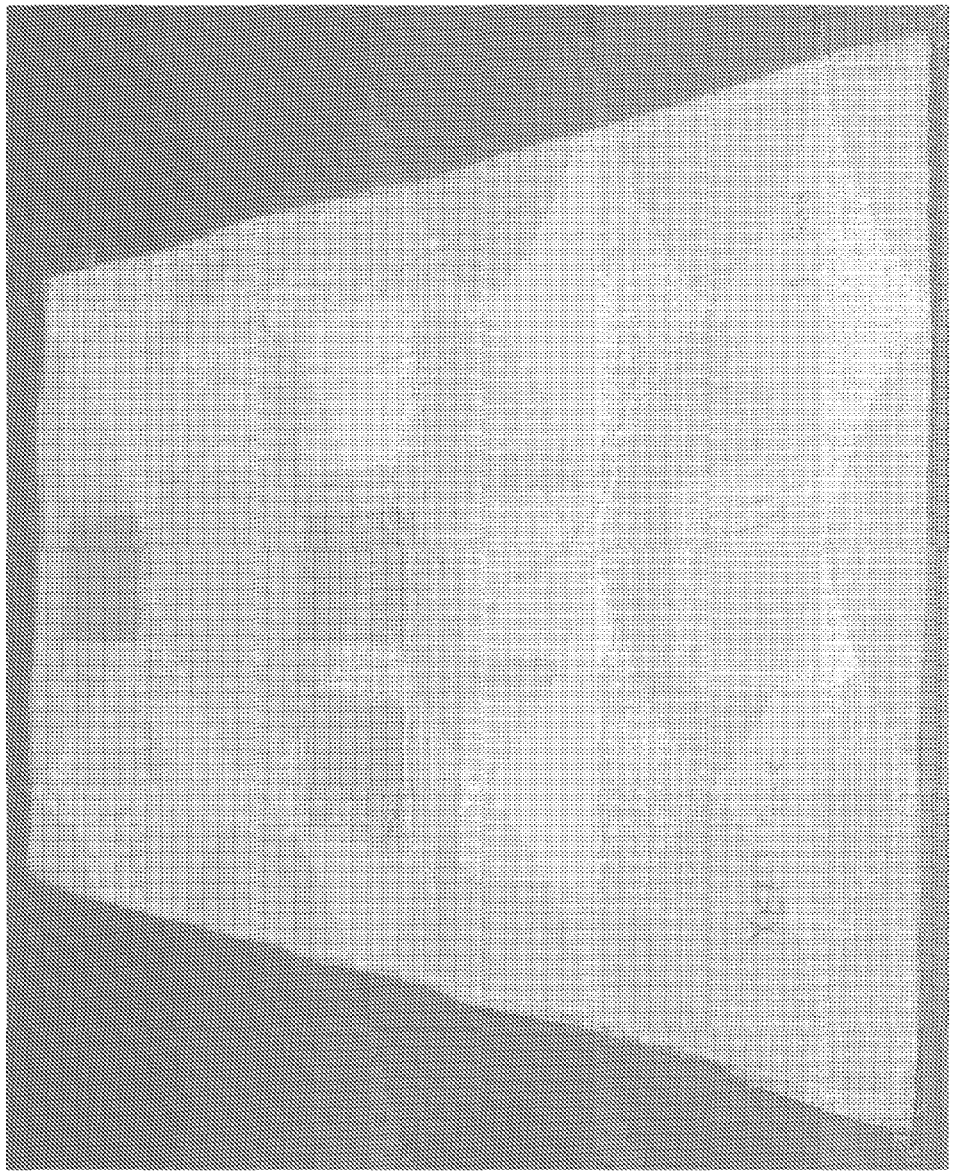
FIG. 14 shows the results of a wash test of a commercial laundry stain monitor using an apparatus and standard process of the invention.
Figure 15:
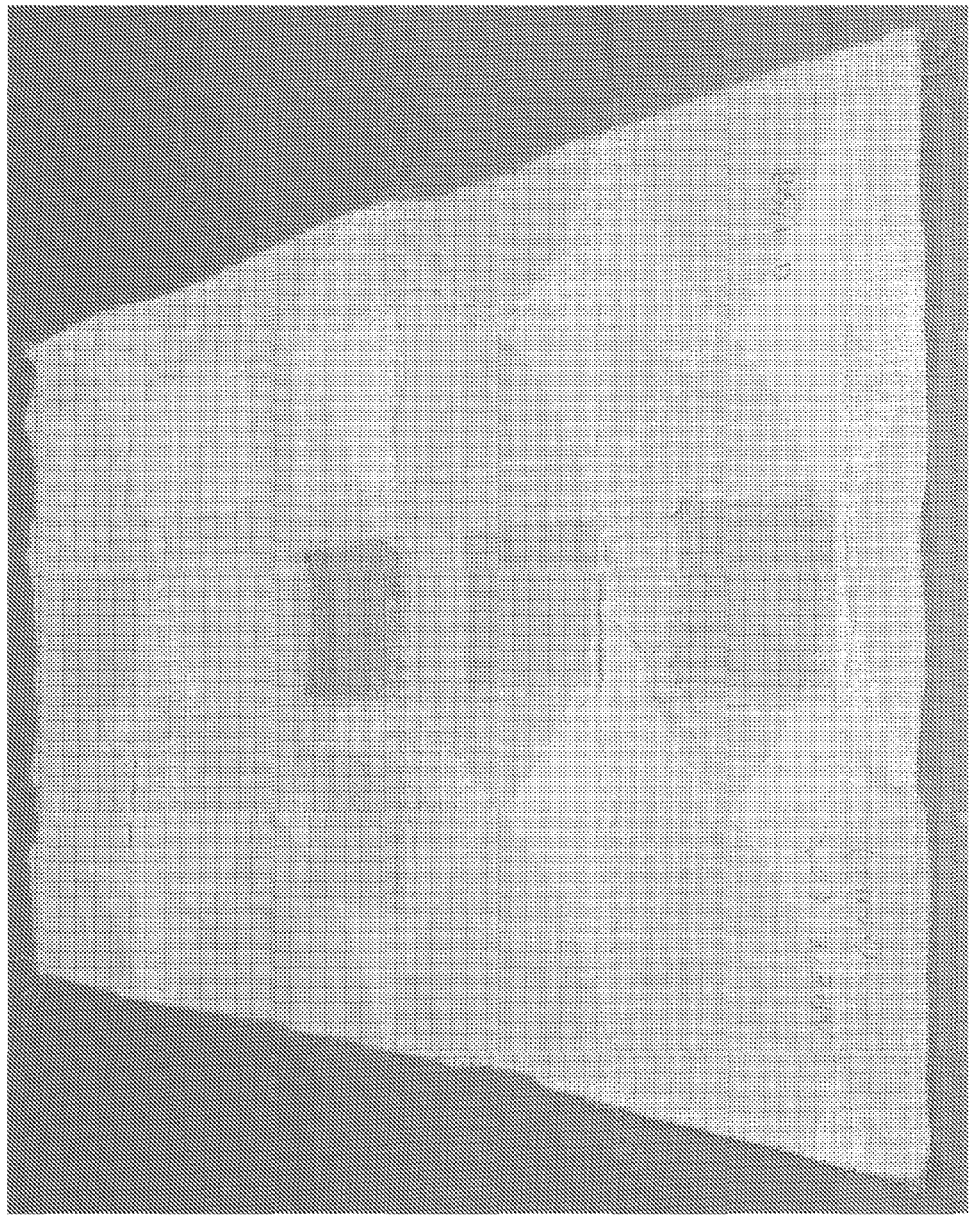
FIG. 15 shows the results of a wash test of a commercial laundry stain monitor using a standard domestic washing machine.

Cotton ballast was also used to make up the washloads for the cleaning tests according to the current invention, but here the washload was 16 kg, containing 3 PCMS-55_05-05×05 stain monitors, and 16 SBL-2004 sebum cloths. The so-called "Xeros Standard" method according to the invention was carried out at 40° C. (74 liters of wash water, i.e. 4.6 liters/kg of washload), and the "Xeros Ambient" method according to the invention, was carried out at 15° C. (28 liters of wash water—i.e. 1.75 liters/kg washload). In each case a three rinse process using 90 liters of water in total was employed, and the bead used was 50 kg of INVISTA 1101 polyester (i.e. 3.1 kg/kg washload). The same detergent was used as with the ML1 and ML2 controls, but now at significantly reduced levels (14.1 ml/kg for "Xeros Ambient" and 18.8 ml/kg for "Xeros Standard"). Examination of the cleaned stain monitors showed that the "Xeros Ambient" process produced superior cleaning performance to the ML1 control (see FIGS. 12 and 13), and the "Xeros Standard" was even more impressive when compared to the ML2 control (see FIGS. 14 and 15). The savings in energy, water and detergent consumption with "Xeros Ambient" versus ML1 and "Xeros Standard" versus ML2 are evident from Table 3.

TABLE 3

WASH TESTS

|  | Controls | | Current Invention | |
|---|---|---|---|---|
|  | ML1 Miele PW 6241 EL 40° C. | ML2 Miele PW 6241 EL 60° C. | "Xeros Ambient" 15° C. | "Xeros Standard" 40° C. |
| Washload | 12 kg | 12 kg | 16 kg | 16 kg |
| Water | 258 litres = 21.5 litres/kg | 258 litres = 21.5 litres/kg | 118 litres = 7.4 litres/kg | 164 litres = 10.2 litres/kg |
| Detergent | 360 ml = 30.0 ml/kg | 360 ml = 30.0 ml/kg | 225 ml = 14.1 ml/kg | 300 ml = 18.8 ml/kg |
| Energy | 4.6 kWh = 0.38 kWh/kg | 6.1 kWh = 0.51 kWh/kg | 0.65 kWh = 0.04 kWh/kg | 2.97 kWh = 0.18 kWh/kg |

Example 4—Cleaning Performance

Energy, water and detergent consumption values were determined for the method of the presently claimed invention when using the preferred apparatus (98 cm diameter cage) and compared with the values ascribed to A class performance in domestic washing, namely: an energy consumption of <0.19 kWh/kg, a water usage of <9.7 liters/kg, and a detergent dosage of approximately 8.0 g/kg (8.5 ml/kg)—see Table 4. Parity cleaning to a 60° C. wash cycle was achieved using the current invention for a 25 kg washload including 5 WFK PCMS-55_05-05×05 professional laundry stain monitors and 25 SBL-2004 sebum cloths, made up to load size with cotton ballast.

The "Xeros Ambient" method according to the invention was carried out at 15° C. as in Example 3 (i.e. 28 liters wash water, equivalent in this case to 1.12 liters/kg washload), and "Xeros Standard" at 40° C. also as in Example 3 (i.e. 74 liters wash water, equivalent in this case to 2.96 liters/kg). In each instance a three rinse process using 90 liters of water in total was again employed, and the bead used was, once more, INVISTA 1101 polyester (50 kg, i.e. 2.0 kg/kg washload). The detergent dosage level, however, was reduced to 7.0 ml/kg (6.6 g/kg) for both processes (Procter & Gamble Professional Ariel® Liquid). It should be noted that only parity cleaning to a 60° C. wash cycle was achieved in this instance, and so the superior cleaning performance achieved by both processes in Example 3 was effectively sacrificed in order to increase the washload size and lower the detergent dosage. The "Xeros Standard" process at 40° C. did slightly outperform the "Xeros Ambient" process at 15° C., however, as would be expected.

TABLE 4

WASH TESTS

|  |  | Current Invention | |
|---|---|---|---|
|  | A Class Domestic Ratings | "Xeros Ambient" 15° C. | "Xeros Standard" 40° C. |
| Washload | N/A | 25 kg | 25 kg |
| Water | <9.7 litres/kg | 118 litres = 4.7 litres/kg | 164 litres = 6.6 litres/kg |
| Detergent | ~8.0 g/kg (~8.5 ml/kg) | 175 ml = 7.0 ml/kg (6.6 g/kg) | 175 ml = 7.0 ml/kg (6.6 g/kg) |
| Energy | <0.19 kWh/kg | 0.65 kWh = 0.03 kWh/kg | 2.97 kWh = 0.12 kWh/kg |

Example 5—Bead Removal from the Washload

Figure 16:
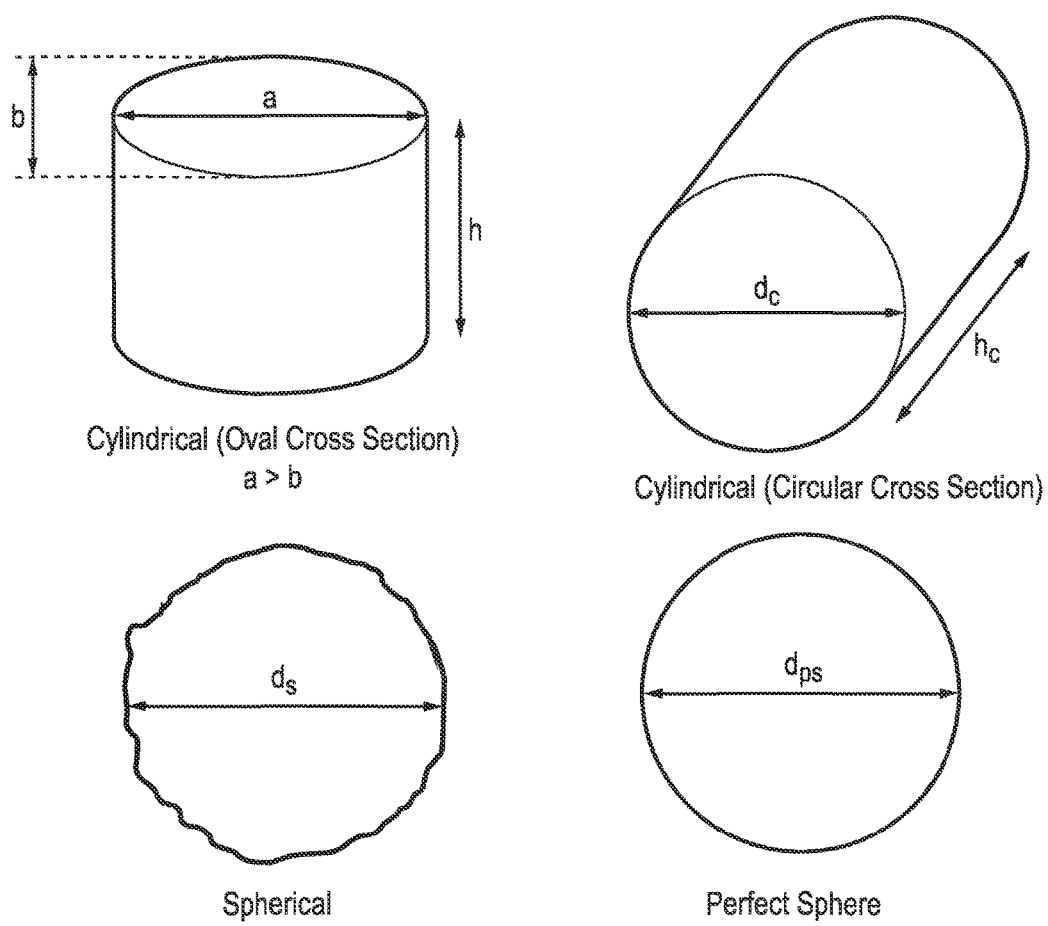
FIG. 16 is a diagrammatic representation of particles which are employed in the method of the invention.

The effects of bead size, shape and density on bead trapping in a washload were tested by individually tumbling 10 kg of various different bead types at G<1 in a sealed drum (50 cm diameter) with 15 dress shirts. The shirts were uniformly wetted with 6 liters of water, and tumbling was carried out at ambient temperature for 30 minutes. The same shirts were dried and re-used for each test. A comparison was then made of the number of beads retained in the shirt pockets, collar bone inserts and button seams in each case. The beads used were as detailed in Table 5 and FIG. 16. The results can be seen in Table 6.

TABLE 5

BEAD TYPES

| Bead Coding | Shape | a (mm) | b (mm) | h (mm) | $d_{ps}$ (mm) | Volume (mm$^3$) | Density (g/cm$^3$) | Bead Material |
|---|---|---|---|---|---|---|---|---|
| 1101 | Cylindrical (Oval Cross Section) | 3.0 | 2.2 | 2.1 | N/A | 11.1 | 1.42 | Polyester (Polyethylene terephthalate - PET) |
| 24BS | Cylindrical (Oval Cross Section) | 2.6 | 1.8 | 2.9 | N/A | 11.3 | 1.11 | Polyamide (Nylon 6,6 - N6,6) |
| 24BL | Cylindrical (Oval Cross Section) | 4.4 | 2.7 | 3.5 | N/A | 32.7 | 1.10 | Polyamide (Nylon 6,6) |

TABLE 5-continued

BEAD TYPES

| Bead Coding | Shape | a (mm) | b (mm) | h (mm) | $d_{ps}$ (mm) | Volume (mm³) | Density (g/cm³) | Bead Material |
|---|---|---|---|---|---|---|---|---|
| 575P | Cylindrical (Oval Cross Section) | 4.2 | 3.5 | 4.0 | N/A | 46.0 | 0.66 | Polypropylene (PP) |
| 101 | Perfect Sphere | N/A | N/A | N/A | 6.0 | 117.4 | 1.16 | Polyamide (Nylon 6,6) |

TABLE 6

BEAD RETENTION IN SHIRTS

| Bead Coding | Number of Beads Retained by Washload $B_{Ret}$ | Total Number of Beads Used in Test (1000s) $B_{Tot}$ | Bead Retention Level $(B_{Ret}/B_{Tot}) \times 100$ (%) |
|---|---|---|---|
| 1101 | 532 | 632 | 0.084 |
| 24BS | 1,718 | 795 | 0.216 |
| 24BL | 267 | 312 | 0.085 |
| 575P | 480 | 328 | 0.146 |
| 101 | 5 | 73 | 0.007 |

It should be noted that the number of beads retained here is high, and not representative of the invention currently claimed. This is due to the fact that the drum used in these tests was sealed (i.e. no sidewall perforations), and hence the beads were effectively being forced into the shirts. The results are still indicative however, of the effects of bead size, shape and density on bead retention and, hence, offer an indication of likely bead removal levels in the current invention.

It can be seen by comparison of the 1101 and 24BS bead retention levels that beads with similar size and shape can be retained to different extents, and that bead density is a key factor in determining retention levels. Higher density beads are less retained and, hence, more likely to be removed in any cleaning process involving polymeric beads.

From a comparison of the 24BS and the 24BL bead retention levels, it is evident that beads of a similar density can also be retained to different extents, and that bead size is another key factor in determining retention levels for a particular bead shape. Larger beads of the same shape are less retained (24BL is 3 times the volume of 24BS) and, thus, more likely to be removed in any process involving polymeric beads.

It is also observed from a comparison of the 1101, 24BS and 575P bead retention levels that bead size can overcome low bead density, to reduce retention levels. Thus, the very low density 575P bead is less retained than the more dense 24BS as it is 4 times the volume of 24BS, but it is still more retained than the denser 1101 in comparison to which it is also 4 times larger.

The move to a still larger bead is therefore perceived to be desirable, and the benefit of this course of action is illustrated by the 101 bead retention level. In this case retention has been effectively eliminated by the move to a much larger bead (101 is more than 10 times the volume of 1101 and 24BS, 3.5 times the volume of 24BL, and 2.5 times the volume of 575P). This result is a clear indication of the effect of size, despite the change of shape from cylindrical to a perfect sphere.

To further emphasise these results, "Xeros Ambient" and "Xeros Standard" wash cycles were run in apparatus as described in WO-A-2011/098815 (98 cm diameter cage). Various 16-25 kg washloads were used as part of a series of trials conducted at commercial laundries in London, UK, for bead 1101, 334 and 335 (see Table 7). Bead 101 was tested separately by Xeros Ltd in Sheffield, UK. Water consumption levels were as described in Examples 3 and 4 (118 liters for "Xeros Ambeint", and 164 liters for "Xeros Standard"). The wash temperatures employed were: "Xeros Ambient" at 15° C., and "Xeros Standard" at 40°, 60° or 65° C., depending on the exact washload used. Detergency was also varied across the different washload types. Table 7 therefore shows the average separation achieved over the washloads tested (some 100 runs in total), and the relative cleaning performance observed for these different bead types.

TABLE 7

SELECTED BEADS AND THEIR ATTRIBUTES

| Bead Coding | Shape | a (mm) | b (mm) | h (mm) | $d_s$ (mm) | $d_{ps}$ (mm) | Volume (mm³) | Density (g/cm³) | Bead Material | Bead Removal Level $100 - (B_{Ret}/B_{Tot} \times 100)$ (%) | Relative Cleaning Performance 10 = Excellent 5 = Average 1 = Very Poor |
|---|---|---|---|---|---|---|---|---|---|---|---|
| 1101 | Cylindrical | 3.0 | 2.2 | 2.1 | N/A | N/A | 11.1 | 1.42 | PET | $100 - ((142/3.16 \times 10^6) \times 100) = 99.996$ | 10 |
| 335 | Spherical | N/A | N/A | N/A | 2.7 | N/A | 16.2 | 1.66 | N6,6 | $100 - ((35/2.81 \times 10^6) \times 100) = 99.999$ | 8 |

TABLE 7-continued

SELECTED BEADS AND THEIR ATTRIBUTES

| Bead Coding | Shape | a (mm) | b (mm) | h (mm) | $d_s$ (mm) | $d_{ps}$ (mm) | Volume (mm³) | Density (g/cm³) | Bead Material | Bead Removal Level $100 - (B_{Ret}/B_{Tot} \times 100)$ (%) | Relative Cleaning Performance 10 = Excellent 5 = Average 1 = Very Poor |
|---|---|---|---|---|---|---|---|---|---|---|---|
| 334 | Spherical | N/A | N/A | N/A | 3.0 | N/A | 17.7 | 1.88 | N6,6 | $100 - ((20/1.96 \times 10^6) \times 100) = 99.999$ | 7 |
| 101 | Perfect Sphere | N/A | N/A | N/A | N/A | 6.0 | 117.4 | 1.16 | N6,6 | $100 - ((3/3.67 \times 10^5) \times 100) = 99.999$ | 5 |

Hence, if as close to complete separation of the bead from the washload as possible is required, then bead 101 would appear to offer the best option. The 50 kg of beads used for a 25 kg washload (i.e. 2.0:1 kg/kg washload) showed only 3 beads retained, or 99.999% bead removal. The compromise, however, is that fewer beads and less mechanical action (due to their perfectly spherical shape), results in some reduction in cleaning performance (see Table 7). For less heavily soiled washloads, however, this may not be a problem and, hence, these beads are still comprised in a preferred embodiment of the current invention.

In the event that the washload is more heavily soiled, then a move to a smaller, spherical bead (not a perfect sphere) may be preferred (coded 334 and 335 in Table 7). In this case, the separation is still acceptable (bead 334: 50 kg of beads used for a 25 kg washload gave 20 beads retained or 99.999% removal; bead 335: 50 kg of beads used for a 25 kg washload gave 35 beads retained or 99.999% removal), but the cleaning performance is increased (more beads/kg added than with bead 101, and with a rougher surface to generate more mechanical action). Hence, these too are included as a preferred embodiment of the current invention, and they are perhaps the best compromise between cleaning performance and separation from the washload.

Finally, if the washload is very heavily soiled, the use of an even smaller cylindrical bead, such as bead 1101, may be preferred (again, see Table 7), as this still further increases cleaning performance (more beads/kg added than with beads 334 or 335, and with well-defined edges to their shape, to generate even more mechanical action). Here, the separation performance does, however, fall slightly: 50 kg of beads used for a 25 kg washload gave 142 beads retained or 99.996% removal. Such beads, therefore, are also comprised in a further embodiment of the invention.

It should be emphasised that the bead selections in Table 7 are not comprehensive, and different balances of bead size, shape and density will affect the cleaning and separation performance of the polymeric particles used. Different choices to those made above within the ranges of bead size, shape and density claimed here could prove equally effective.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method for the cleaning of a soiled substrate, said method comprising treating the substrate with a solid particulate cleaning material and wash water, said treatment being carried out in an apparatus comprising a drum comprising perforated side walls and having a capacity of between 5 and 50 liters for each kg of fabric in the washload, wherein said solid particulate cleaning material comprises a multiplicity of polymeric particles at a particle to fabric addition level of 0.1:1-10:1 by mass, each particle being substantially cylindrical or spherical in shape and having an average density in the range of 0.5-2.5 g/cm³ and an average volume in the range of 5-275 mm³, and wherein said drum comprising perforated side walls is rotated at a speed which generates G forces in the range of from 0.05 to 900 G, wherein the method comprises performing, in sequence, the steps of:
(a) washing;
(b) first extraction of excess water;
(c) first separation of polymeric particles without the presence of excess water;
(d) rinsing;
(e) second extraction of excess water;
(f) optionally repeating steps (d) and (e) at least once; and (g) second separation of polymeric particles without the presence of excess water, wherein steps (d) and (e) are optionally repeated up to 10 times, and wherein said washing process in step (a) is carried out at between 0.05 and 0.95 G, the excess water is extracted at a higher G force of 5.5 to 900 G, and the separation of polymeric particles from the fabric is carried out at 0.05 to 0.95 G.

2. A method as claimed in claim 1 wherein the solid particulate cleaning material is separated and recovered and then re-used in subsequent cleaning processes.

3. A method as claimed in claim 1 wherein the solid particulate cleaning material is cleaned intermittently in order to maintain its efficacy.

4. A method as claimed in claim 1 wherein cleaning temperatures do not exceed 75° C.

5. A method as claimed in claim 1 wherein said polymeric particles comprise beads of polyalkenes, polyamides, polyesters or polyurethanes.

6. A method as claimed in claim 1 wherein said polymeric particles comprise monomeric units derived from monomers which comprise ionically charged or polar moieties, or unsaturated organic groups.

7. A method as claimed in claim 1 wherein said multiplicity of polymeric particles comprises cylindrical particles of oval cross section having a major cross section axis length of 2.0-6.0 mm and/or a minor cross section axis length of 1.3-5.0 mm and/or a length of 1.5-6.0 mm.

8. A method as claimed in claim 1 wherein said multiplicity of polymeric particles comprises cylindrical particles of circular cross section having a diameter of 1.3-6.0 mm and/or a length of 1.5-6.0 mm.

9. A method as claimed in claim 1 wherein said multiplicity of polymeric particles comprises spherical particles having a diameter of 2.0-8.0 mm, and said particles optionally comprise perfect spheres.

10. A method as claimed in claim 1 wherein said drum comprising perforated side walls comprises a rotatably mounted cylindrical cage.

11. A method as claimed in claim 10 wherein said rotatably mounted cylindrical cage is comprised in said cleaning apparatus, wherein said cleaning apparatus comprises a housing and access means, allowing access to the interior of said cylindrical cage.

12. A method as claimed in claim 11 wherein said access means comprises a hinged door mounted in the housing which may be opened to allow access to the inside of the cylindrical cage and which may be closed in order to provide a substantially sealed system.

13. A method as claimed in claim 10 wherein a wash cycle comprises the steps of:

(i) introducing the solid particulate cleaning material and water into a second chamber of an apparatus as hereinbefore described;

(ii) agitating said solid particulate cleaning material and water;

(iii) loading at least one soiled substrate into said rotatably mounted cylindrical cage via access means;

(iv) closing the access means so as to provide a substantially sealed system;

(v) causing the rotatably mounted cylindrical cage to rotate whilst introducing said wash water and any required additional cleaning agent to uniformly wet out the substrate;

(vi) introducing said solid particulate cleaning material into said rotatably mounted cylindrical cage, and operating the apparatus for a wash cycle, wherein said rotatably mounted cylindrical cage continues to rotate, and wherein fluids and solid particulate cleaning material are caused to fall through perforations in said rotatably mounted cylindrical cage into said second chamber in a controlled manner;

(vii) operating pumping means so as to transfer fresh solid particulate cleaning material and recycle used solid particulate cleaning material to separating means;

(viii) operating control means so as to add said fresh and recycled solid particulate cleaning material to said rotatably mounted cylindrical cage in a controlled manner; and (ix) continuing with steps (vi), (vii) and (viii) as required to effect cleaning of the soiled substrate.

14. A method as claimed in claim 1 wherein at least one additional cleaning agent is employed.

15. A method as claimed in claim 14 wherein said at least one additional cleaning agent comprises a detergent composition comprising cleaning components and post-treatment components.

16. A method as claimed in claim 1 which is carried out at a wash water to substrate ratio of between 5.0:1 and 0.1:1 w/w.

* * * * *